United States Patent
Tomizawa et al.

(10) Patent No.: US 12,457,317 B2
(45) Date of Patent: Oct. 28, 2025

(54) DISPLAY DEVICE AND DISPLAY SYSTEM

(71) Applicant: Magnolia White Corporation, Tokyo (JP)

(72) Inventors: Kazunari Tomizawa, Tokyo (JP); Akira Hasegawa, Tokyo (JP); Toshinori Uehara, Tokyo (JP)

(73) Assignee: Magnolia White Corporation, Tokyo (JP)

( * ) Notice: Subject to any disclaimer, the term of this patent is extended or adjusted under 35 U.S.C. 154(b) by 48 days.

(21) Appl. No.: 18/396,299

(22) Filed: Dec. 26, 2023

(65) Prior Publication Data

US 2024/0223743 A1    Jul. 4, 2024

(30) Foreign Application Priority Data

Dec. 28, 2022    (JP) ................... 2022-212730

(51) Int. Cl.
  *G06F 3/01* (2006.01)
  *H04N 13/31* (2018.01)
  *H04N 13/327* (2018.01)
  *H04N 13/383* (2018.01)

(52) U.S. Cl.
  CPC ........... *H04N 13/383* (2018.05); *H04N 13/31* (2018.05); *H04N 13/327* (2018.05)

(58) Field of Classification Search
  CPC .... H04N 13/383; H04N 13/31; H04N 13/327; H04N 13/307; H04N 13/385; H04N 21/654
  See application file for complete search history.

(56) References Cited

U.S. PATENT DOCUMENTS

| | | | | |
|---|---|---|---|---|
| 11,847,715 | B2 * | 12/2023 | Nakata | G09G 5/00 |
| 2012/0327080 | A1 * | 12/2012 | Arakita | G06T 19/00 |
| | | | | 345/204 |
| 2013/0128019 | A1 * | 5/2013 | Tajima | G02B 30/30 |
| | | | | 348/59 |
| 2021/0088793 | A1 * | 3/2021 | Tominaga | G09G 5/00 |
| 2022/0107519 | A1 * | 4/2022 | Chen | H10K 59/50 |
| 2022/0169257 | A1 * | 6/2022 | Kikuta | B60W 40/04 |
| 2023/0368744 | A1 * | 11/2023 | Watanabe | G09G 3/2074 |

FOREIGN PATENT DOCUMENTS

| | | | | |
|---|---|---|---|---|
| EP | 730255 A1 * | 9/1996 | | G09B 5/062 |
| JP | H01-141479 A | 6/1989 | | |

* cited by examiner

*Primary Examiner* — Gims S Philippe
(74) *Attorney, Agent, or Firm* — K&L Gates LLP

(57) ABSTRACT

According to an aspect, a display device includes: a display that includes a plurality of pixels arranged in a predetermined direction and is configured to output an image; an acquirer configured to periodically acquire information related to a sight line of a user visually recognizing the image; a storage configured to store image group data provided from an external information processing device based on the information at a first time point; and a display controller configured to select display data corresponding to the sight line from among the image group data based on the information at a second time point later than the first time point and cause the display to display the display data.

6 Claims, 20 Drawing Sheets

DISPLAY DEVICE AND DISPLAY SYSTEM

CROSS-REFERENCE TO RELATED APPLICATION

This application claims the benefit of priority from Japanese Patent Application No. 2022-212730 filed on Dec. 28, 2022, the entire contents of which are incorporated herein by reference.

BACKGROUND

1. Technical Field

What is disclosed herein relates to a display device and a display system.

2. Description of the Related Art

As disclosed in Japanese Patent Application Laid-open Publication No. H1-141479, a display system has been known in which a display image is provided from a server based on user's sight line position information output from a display device.

However, with conventional technologies, a time lag occurs to sight line position information between a provision time point at which an image is provided by the server and an output time point at which the provided image is output from the display device, and thus the image does not correspond to the sight line of the user at the output time point in some cases. Thus, a method of outputting an image corresponding to the sight line of the user at a later time point has been desired.

For the foregoing reasons, there is a need for a display device and a display system that are capable of outputting images corresponding to the viewpoint of a user at a later time point.

SUMMARY

According to an aspect, a display device includes: a display that includes a plurality of pixels arranged in a predetermined direction and is configured to output an image; an acquirer configured to periodically acquire information related to a sight line of a user visually recognizing the image; a storage configured to store image group data provided from an external information processing device based on the information at a first time point; and a display controller configured to select display data corresponding to the sight line from among the image group data based on the information at a second time point later than the first time point and cause the display to display the display data.

According to an aspect, a display system includes a display device and a server provided capable of performing communication with the display device. The display device includes a display that includes a plurality of pixels arranged in a predetermined direction and is configured to output an image, an acquirer configured to periodically acquire information related to a sight line of a user visually recognizing the image, a storage configured to store image group data provided from the server based on the information at a first time point, and a display controller configured to select display data corresponding to the sight line from among the image group data based on the information at a second time point later than the first time point and cause the display to display the display data. The server includes a storage configured to store original data including the image group data and including pieces of image data corresponding to three or more sight line angles, and an extractor configured to generate an extracted element image group as a source of the image group data from the original data based on the information.

DETAILED DESCRIPTION

An embodiment of the present disclosure is described below with reference to the drawings. What is disclosed herein is only an example, and any modification that can be easily conceived by those skilled in the art while maintaining the main purpose of the disclosure are naturally included in the scope of the present disclosure. The drawings may be schematically represented in terms of the width, thickness, shape, etc. of each part compared to those in the actual form for the purpose of clearer explanation, but they are only examples and do not limit the interpretation of the present disclosure. In the present specification and the drawings, the same reference signs are applied to the same elements as those already described for the previously mentioned drawings, and detailed explanations may be omitted as appropriate.

Figure 1:
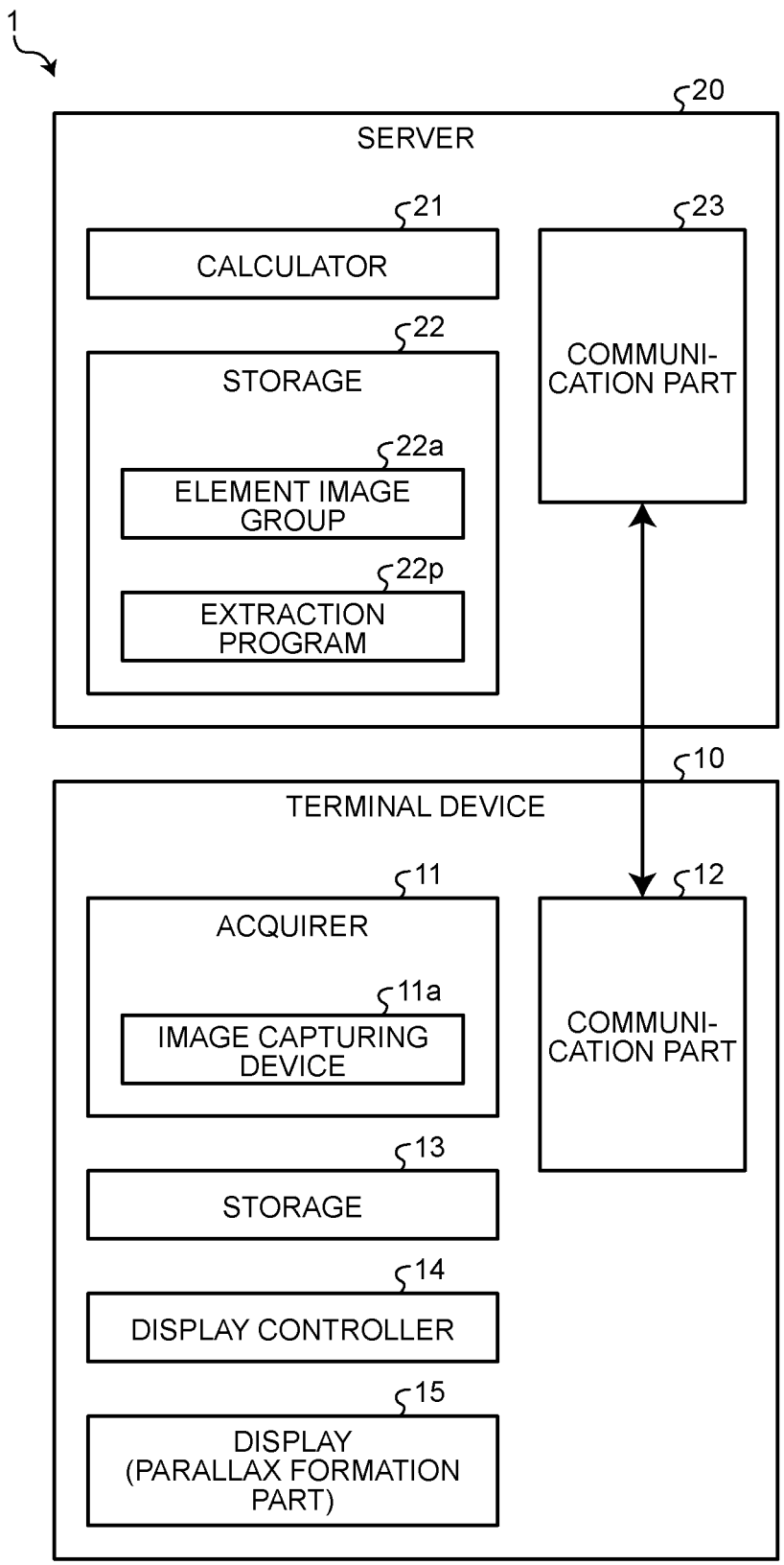
FIG. 1 is a block diagram illustrating a main configuration of a display system.

FIG. 1 is a block diagram illustrating a main configuration of a display system 1. The display system 1 includes a terminal device 10 and a server 20. The terminal device 10 includes an acquirer 11, a communication part 12, a storage 13, a display controller 14, and a display 15. The server 20 includes a calculator 21, a storage 22, and a communication part 23. In the following description of images and image processing, images are visualized as individual specific image pictures, but in reality, images are image signals (image data) and image processing is signal processing (data processing) by software or hardware in the server or the terminal device, and thus images do not need to be actually visualized for each image processing.

The terminal device 10 is a display device for a user to visually recognize an image output from the display 15. In the following description, "output" means display output for image visual recognition by the user unless otherwise stated. The terminal device 10 is a portable terminal device such as a smartphone but not limited thereto. The terminal device 10 may be a portable or stationary display terminal device. In the following description, a "user" means a human visually recognizing an image output from the display 15 unless otherwise stated.

The acquirer 11 acquires sight line information of the user. Specifically, the acquirer 11 includes, for example, an image capturing device 11a. The image capturing device 11a captures an image of the face of the user facing an image display surface 15a. The area (such as angle of view) of image capturing by the image capturing device 11a is set in consideration of the position of the face of the user facing the image display surface 15a (refer to FIG. 24, for example) of the display 15. Specifically, the image capturing device 11a includes an image capturing element such as a complementary metal oxide semiconductor (CMOS) image sensor and generates image data by the image capturing element. In the following description, "sight line information" means the sight line information of the user unless otherwise stated.

The acquirer 11 also includes a circuit from performing arithmetic processing of analyzing image data. The circuit is, for example, a circuit provided as a "system on a chip" (SoC) in the terminal device 10 but not limited thereto and may be a dedicated circuit for the acquirer 11. The acquirer 11 performs arithmetic processing of acquiring the sight line information based on the positions of eyes (right and left eyes) in a face image of the user included in image data obtained by the image capturing device 11a. The sight line information includes at least information indicating the angle of the sight line of the user relative to the display 15.

The arithmetic processing of acquiring the sight line information is, for example, OpenCV but not limited thereto and may be any other arithmetic processing that can determine the positions and orientations of two eyes included in a face image of a human.

The communication part 12 and the communication part 23 perform communication with an external information processing device. Specifically, the communication part 12 and the communication part 23 each include a circuit for functioning as a network interface controller (NIC). The communication part 12 and the communication part 23 can transmit and receive data to and from each other by the same communication protocol. A communication path between the communication part 12 and the communication part 23 is, for example wireless but may be wired or mixture of wireless and wired paths. The communication path may include a public information communication network such as the Internet or may be a dedicated communication path.

In an embodiment, the sight line information acquired by the acquirer 11 is transmitted to the server 20 through the communication part 12 and received by the communication part 23. In addition, in the embodiment, an extracted element image group (such as an extracted element image group 22b to be described later; refer to FIG. 13) generated based on the sight line information is transmitted from the server 20 through the communication part 23 and received by the communication part 12. The extracted element image group is data as a source of a parallax image group Ext (refer to FIG. 15, for example) to be described later. Details thereof will be described later.

The storage 13 stores various kinds of data related to display output, such as the extracted element image group transmitted from the server 20 through communication by the communication part 12. The storage 13 includes a storage device that can store image data. The storage device is, for example, a semiconductor element that functions as a random access memory (RAM), or a semiconductor element such as a flash memory but not limited thereto and may be any other component that functions in the same manner.

The display controller 14 generates a parallax image group by developing the extracted element image group stored in the storage 13 and controls the output from the display 15 based on the parallax image group. A function of the display controller 14 may be, for example, a function of a circuit provided as a SoC on the terminal device 10 or a function of a circuit dedicated for the display controller 14. The display 15 performs image output under control by the display controller 14. The display 15 is, for example, a transmissive liquid crystal display but not limited thereto and may be a display that functions in the same manner by another method.

The server 20 is an information processing device provided to perform communication with the terminal device 10. The calculator 21 performs various kinds of processing related to operation of the server 20. The server 20 includes, for example, a circuit that functions as a central processing unit (CPU), and the CPU reads a computer program and the like in accordance with processing from the storage 22 and executes the computer program. The computer program and the like include what is called a software program and various kinds of information read in executing of the software program.

The storage 22 stores various kinds of data. The storage 22 includes at least one of a solid state drive (SSD), a hard disk drive (HDD), and any other storage device. The storage 22 stores an element image group 22a and an extraction program 22p. The element image group 22a is image data as a source of an image that is displayed on the display 15 of the terminal device 10. The element image group 22a includes image data corresponding to a plurality of sight lines. The extraction program 22p is a computer program or the like executed by the calculator 21. The calculator 21 executing the extraction program 22p functions as an extractor 25 (refer to FIG. 2).

Figure 2:
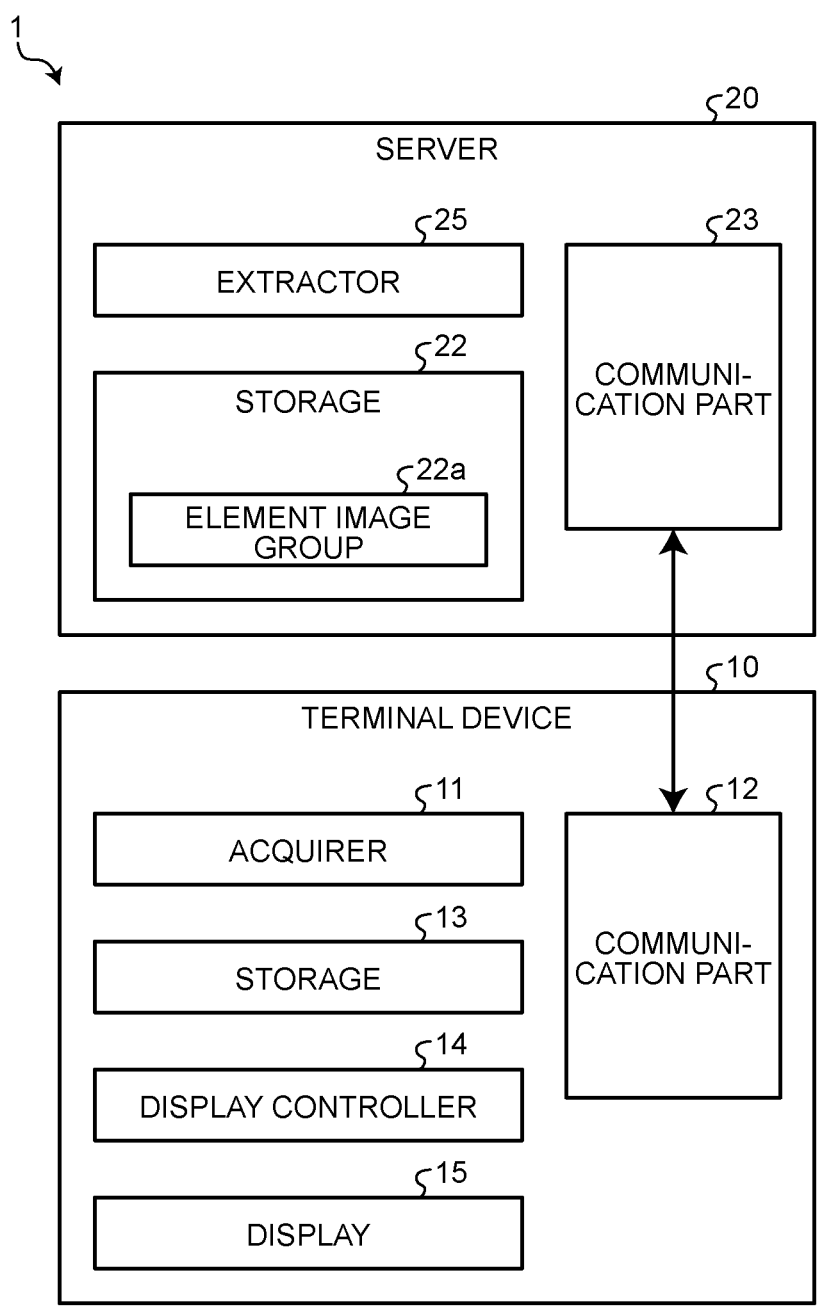
FIG. 2 is a block diagram illustrating a main functional configuration of the display system.

FIG. 2 is a block diagram illustrating a main functional configuration of the display system 1. The extractor 25 generates the extracted element image group 22b from the element image group 22a based on the sight line information acquired by the acquirer 11.

Figure 3:
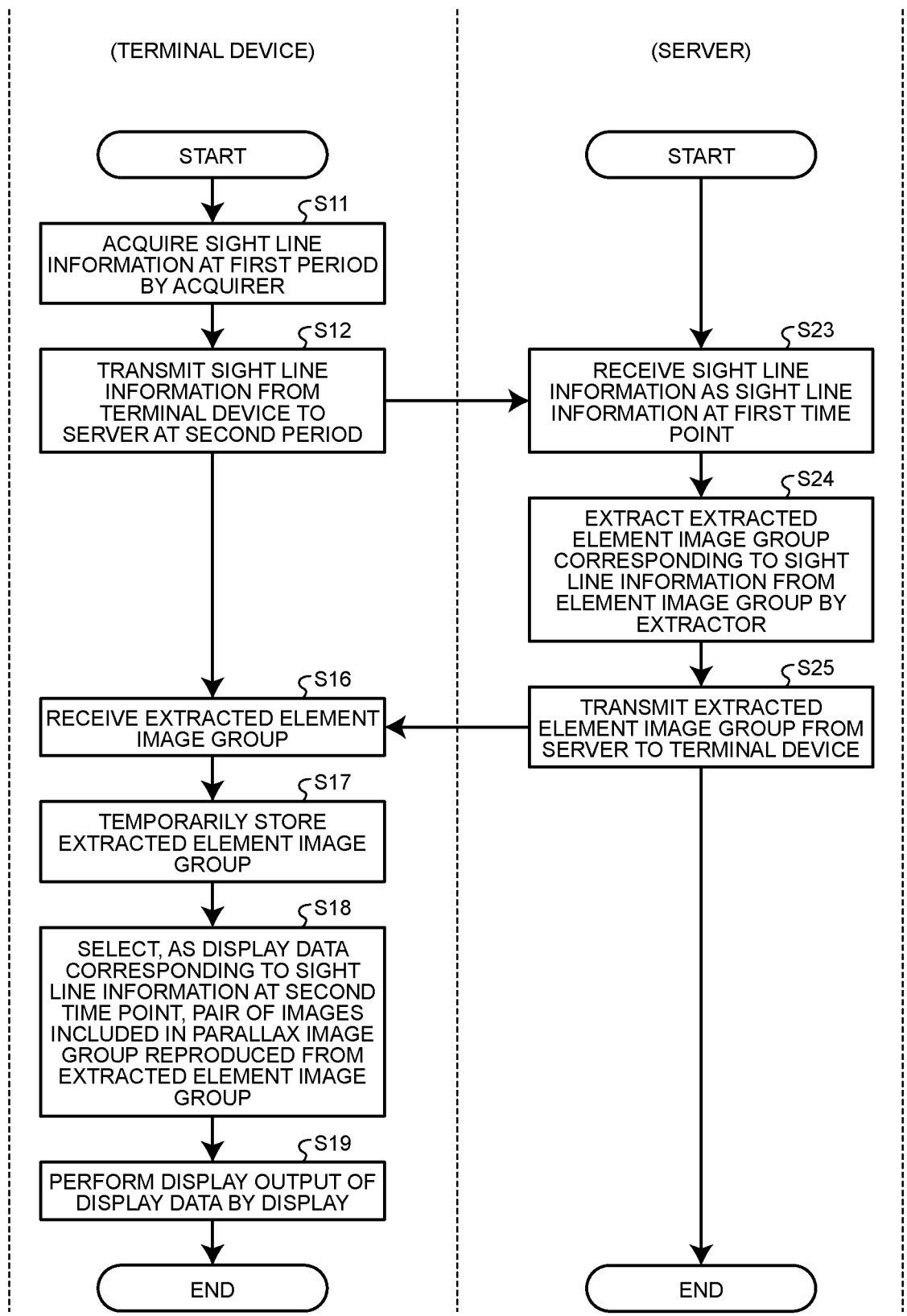
FIG. 3 is a flowchart illustrating an exemplary process of main processing in the display system.

FIG. 3 is a flowchart illustrating an exemplary process of main processing in the display system 1. First, the acquirer 11 of the terminal device 10 acquires the sight line information at a first period (step S11). The sight line information acquired through the processing at step S11 is transmitted from the terminal device 10 to the server 20 (step S12). The transmission of the sight line information by the processing at step S12 is performed at a second period longer than the first period in which step S11 is performed. Specifically, one or some pieces of the sight line information at a plurality of timings, which are acquired through repetition of the processing at step S11 at the first period are transmitted from the terminal device 10 to the server 20. In other words, not all pieces of the sight line information at a plurality of timings are transmitted from the terminal device 10 to the server 20.

The following describes the process of processing after one execution of the processing at step S12 at a time point. The server 20 receives the sight line information transmitted in the processing at step S12 (step S23). The calculator 21 of the server 20 extracts some data included in the element image group 22a as the extracted element image group 22b corresponding to a user's sight line indicated by the sight line information obtained in the processing at step S23 (step S24). The extracted element image group 22b generated in the processing at step S24 is transmitted from the server 20 to the terminal device 10 (step S25). Hereinafter, the sight line information referred to generate the extracted element image group 22b in the processing at step S24 is referred to as the sight line information at a first time point.

The terminal device 10 receives the extracted element image group 22b transmitted in the processing at step S25 (step S16). The terminal device 10 temporarily stores the extracted element image group 22b obtained in the processing at step S16 in the storage 13 (step S17). The display controller 14 of the terminal device 10 selects a pair of parallax images included in the parallax image group Ext reproduced from the extracted element image group 22b obtained in the processing at step S16, as display data corresponding to a user's sight line indicated by the sight line information obtained at a second time point later than the first time point (step S18). The sight line information obtained at the second time point is the sight line information obtained in the processing at step S11 repeated at the first period and is the sight line information obtained in the processing at step S11 performed at a time point later than the sight line information transmitted in the processing at step S12 (sight line information at the first time point) as a source of the processing at step S17. The display 15 performs output corresponding to the display data selected in the processing at step S18 (step S19).

Various matters related to the process of processing in the display system 1 will be described below in more detail. First, the theoretical background of an image output by the display 15 in the embodiment will be described with reference to FIGS. 4 and 5.

Figure 4:
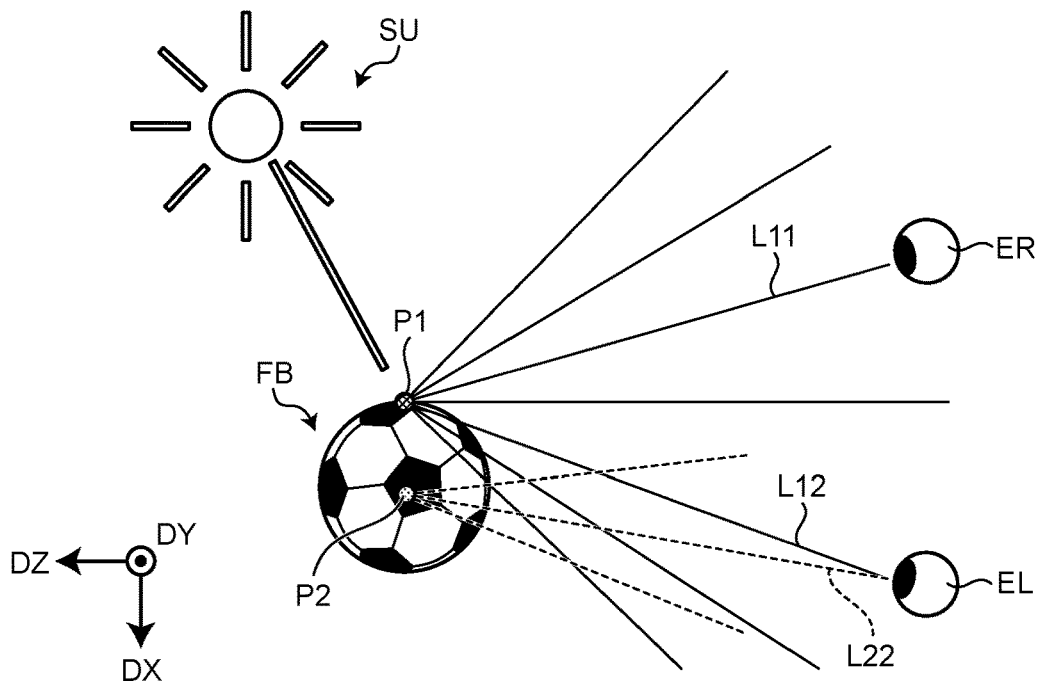
FIG. 4 is a schematic view illustrating the mechanism of visual recognition of a stereoscopic object by a human under natural environment.

FIG. 4 is a schematic view illustrating the mechanism of visual recognition of a stereoscopic object by a human under natural environment. A right eye ER and a left eye EL illustrated in FIG. 4 and other figures are the right and left eyes of a user as a human.

Typically, visual recognition of a target object FB by the user holds when light emitted from a light source SU is reflected by the target object FB and reaches the right eye ER and the left eye EL. Stereoscopic viewing holds because of the difference between images visually recognized by the right and left eyes of a human. For example, reflected light L11 toward the right eye ER and reflected light L12 toward the left eye EL occur at a point P1 on the target object FB illustrated in FIG. 4. The reflected light L11 and the reflected light L12 are not identical to each other. Reflected light L22 toward the left eye EL occurs but no reflected light toward the right eye ER occurs at a point P2 on the target object FB. Stereoscopic viewing of the target object FB by the user holds because of the degree and difference of light reflection at places on the target object FB.

Visual recognition of a stereoscopic image can be artificially achieved by controlling light reaching the right eye ER and light reaching the left eye EL based on the above-described mechanism of stereoscopic viewing so that stereoscopic viewing holds.

Figure 5:
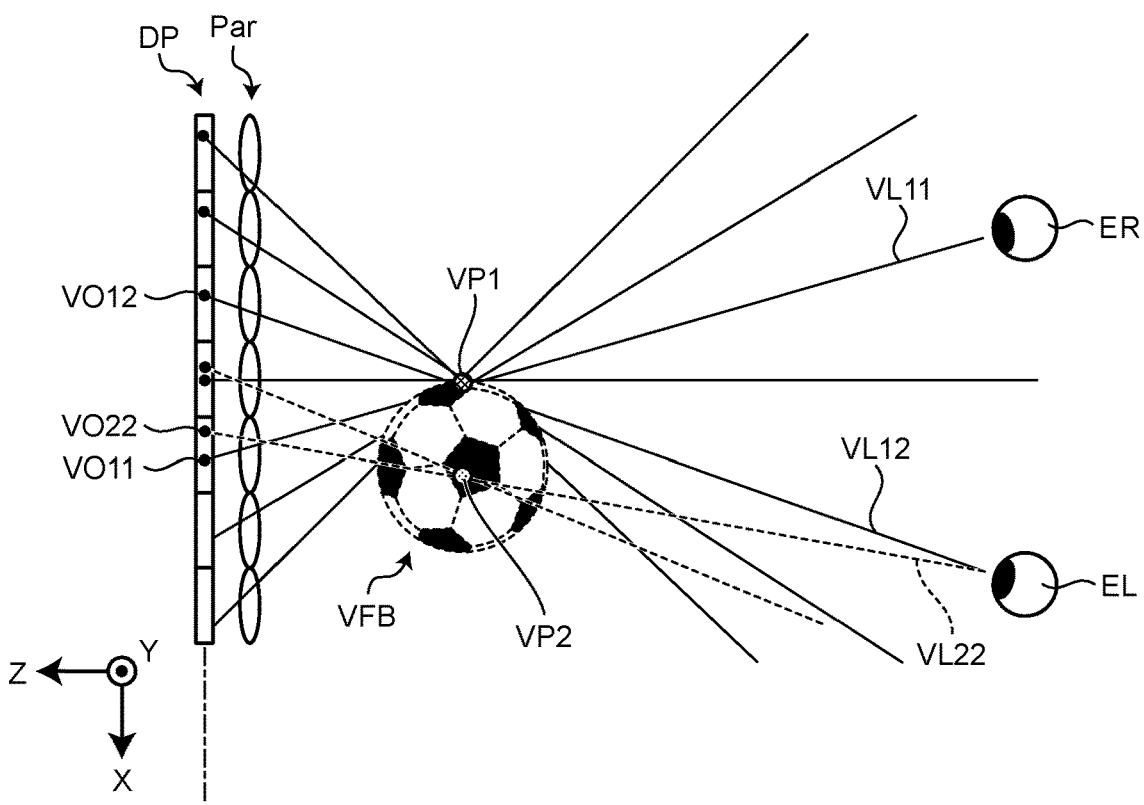
FIG. 5 is a schematic view illustrating the mechanism of outputting a 3D image and visual recognition of the 3D image by a user.

FIG. 5 is a schematic view illustrating the mechanism of outputting a 3D image (stereoscopic image) by an integral imaging method and visual recognition of the 3D image by the user. For example, a 3D reproduced object VFB illustrated in FIG. 5 is a 3D image of the target object FB illustrated in FIG. 4. A virtual point VP1 illustrated in FIG. 5 is a position corresponding to the point P1 illustrated in FIG. 4 and is a focal point of the right eye ER and the left eye EL of the user. A virtual point VP2 illustrated in FIG. 5 is a position corresponding to the point P2 illustrated in FIG. 4.

When such 3D output is to be performed that the 3D reproduced object VFB is visually recognized by the user, at least light VL11 needs to reach the right eye ER and light VL12 and light VL22 need to reach the left eye EL. The light VL11 corresponds to the reflected light L11. The light VL12 corresponds to the reflected light L12. The light VL22 corresponds to the reflected light L22. For simplification, the following description is specially made for the light VL11, VL12, and VL22, and description of propagation lines of other light necessary for visual recognition of the 3D reproduced object VFB by the user is omitted.

FIG. 5 illustrates an example in which an image display panel DP and a parallax formation part Par output the light VL11 from a point VO11, the light VL12 from a point VO12, and the light VL22 from a point VO22. Thus, the user can visually recognize the 3D reproduced object VFB.

With a simple display device, the output from the point VO11 can be visually recognized by the left eye EL and the output from the points VO12 and VO22 can be visually recognized by the right eye ER, and thus, a 3D image output such as the 3D reproduced object VFB is not achieved. Thus, in the example illustrated in FIG. 5, the parallax formation part Par is provided as a component that prevents visual recognition of the output from the point VO11 by the left eye EL and prevents visual recognition of the output from the points VO12 and VO22 by the right eye ER.

More specifically, to achieve an integral imaging 3D display with which the user visually recognizes the 3D reproduced object VFB that is substantially the same as the target object FB positioned in a third direction DZ with respect to the eyes of the user arranged in a first direction DX in FIG. 4, the emission direction of light from the image display panel DP relative to the arrangement of the right eye ER and the left eye EL of the user needs to correspond to the state illustrated in FIG. 4. In the following description of the positional relation between a display device such as the image display panel DP and the right eye ER and the left eye EL of the user, the direction in which the right eye ER and the left eye EL are arranged is defined as an X direction. The X direction corresponds to the first direction DX illustrated in FIG. 4. The direction in which the user faces the display device (such as the image display panel DP or the terminal device 10) is defined as a Z direction. The Z direction substantially corresponds to the third direction DZ illustrated in FIG. 4. A direction orthogonal to the X and Z directions is defined as a Y direction. The Y direction corresponds to a second direction DY illustrated in FIG. 4. The second direction DY is orthogonal to the first direction DX and the third direction DZ.

Figure 6:
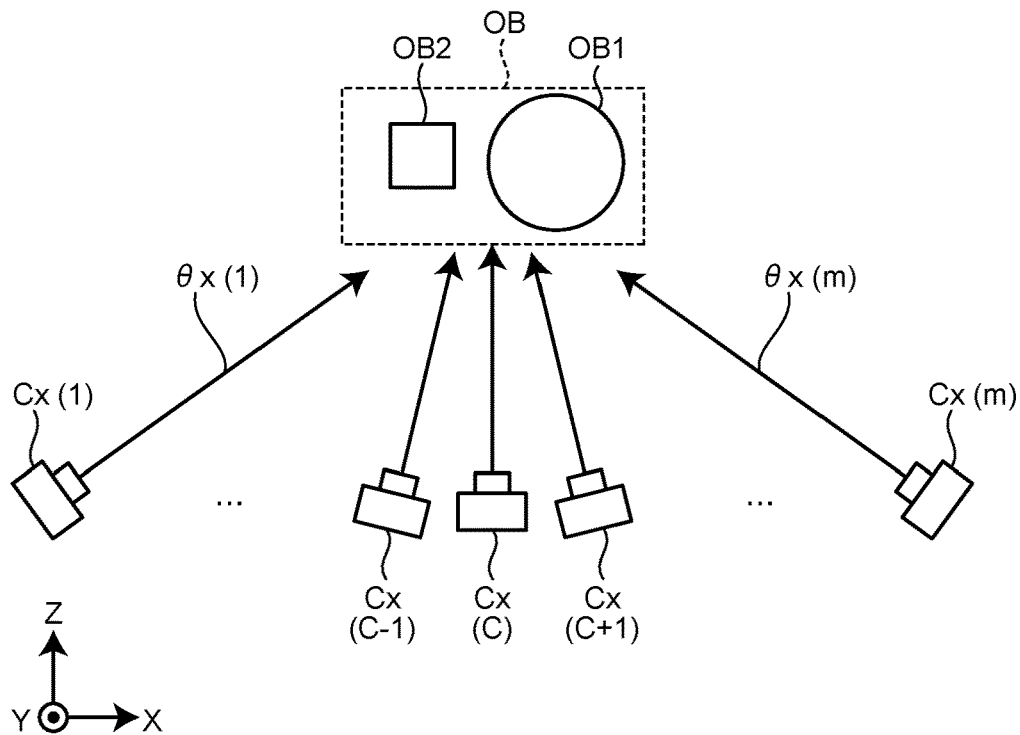
FIG. 6 is a schematic view illustrating an exemplary method of capturing images that are prepared to achieve 3D.
Figure 7:
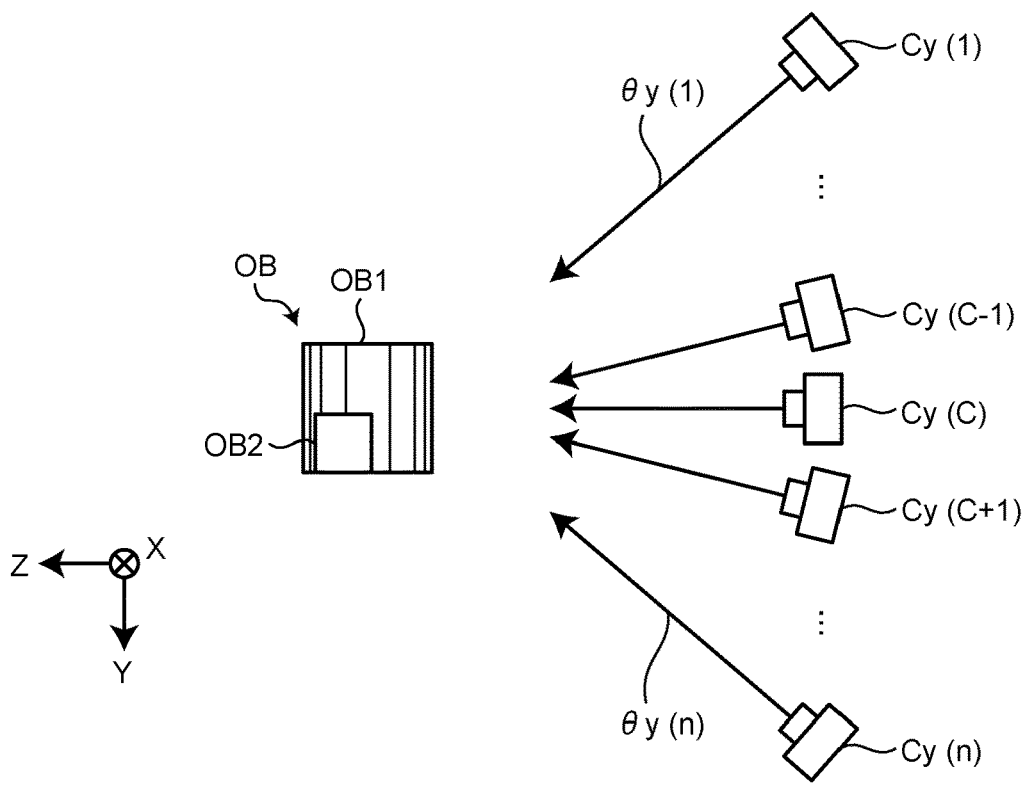
FIG. 7 is a schematic view illustrating the exemplary method of capturing images that are prepared to achieve 3D.

FIGS. 6 and 7 are schematic views illustrating an exemplary method of capturing images that are prepared to achieve 3D display using methods including the integral imaging method and a parallax method. In FIGS. 6 and 7, an object OB is a target to be image-captured and is a target of reproduction through the 3D image output by the display system 1. The object OB includes an object OB1 and an object OB2. The object OB is a target to be image-captured that is exemplified merely for description. The target to be image-captured as a source of an image that can be output in the embodiment is not limited to the object OB but may be any object that can be subjected to image capturing.

In the above-described 3D display output, a plurality of pieces of image data in the X and Y directions are prepared for flexible application to the viewpoints of a plurality of users at different positions and movement of the viewpoint of one user. Thus, image capturing of the object OB is performed by a plurality of image capturing devices Cx(1), ..., Cx(m) and Cy(1), ..., Cy(n) arranged in the X and Y directions as illustrated in FIGS. 6 and 7, and image data as a source of 3D output is generated. More specifically, original images are captured by the image capturing devices, and an original image group is generated in which the plurality of original images are arranged in accordance with the arrangement of the above-described image capturing devices Cx(1), ..., Cx(m) and Cy(1), ..., Cy(n).

The set of image capturing devices Cx(1), ..., Cx(m) illustrated in FIG. 6 and the set of image capturing devices Cy(1), ..., Cy(n) illustrated in FIG. 7 do not each represent a single line of image capturing devices but represent a plurality of image capturing devices disposed in a matrix of rows and columns in the X and Y directions and facing the object OB. In other words, the image capturing devices Cx(1), ..., Cx(m) arranged in the X direction as illustrated in FIG. 6 are each arranged as the image capturing devices Cy(1), ..., Cy(n) in the Y direction as illustrated in FIG. 7.

The number m of the image capturing devices Cx(1), ..., Cx(m) illustrated in FIG. 6 indicates the number of image capturing devices arranged in the X direction. The number n of the image capturing devices Cy(1), ..., Cy(n) illustrated in FIG. 7 indicates the number of image capturing devices arranged in the Y direction. The numbers m and n are natural numbers of three or more. The numbers m and n may be equal to each other or different from each other. In addition, (C−1), (C), and (C+1) illustrated in FIGS. 6 and 7 are written to selectively indicate image capturing devices disposed near the middle point in the arrangement of image capturing devices in the X and Y directions and have no other meaning. In the arrangement of image capturing devices including the image capturing device Cx(C) as in FIGS. 6 and 7, m and n are odd numbers, but the number of image capturing devices arranged for use in image capturing for generation of image data for 3D output is not limited to an odd number but may be an even number in at least one of the X and Y directions.

Figure 8:
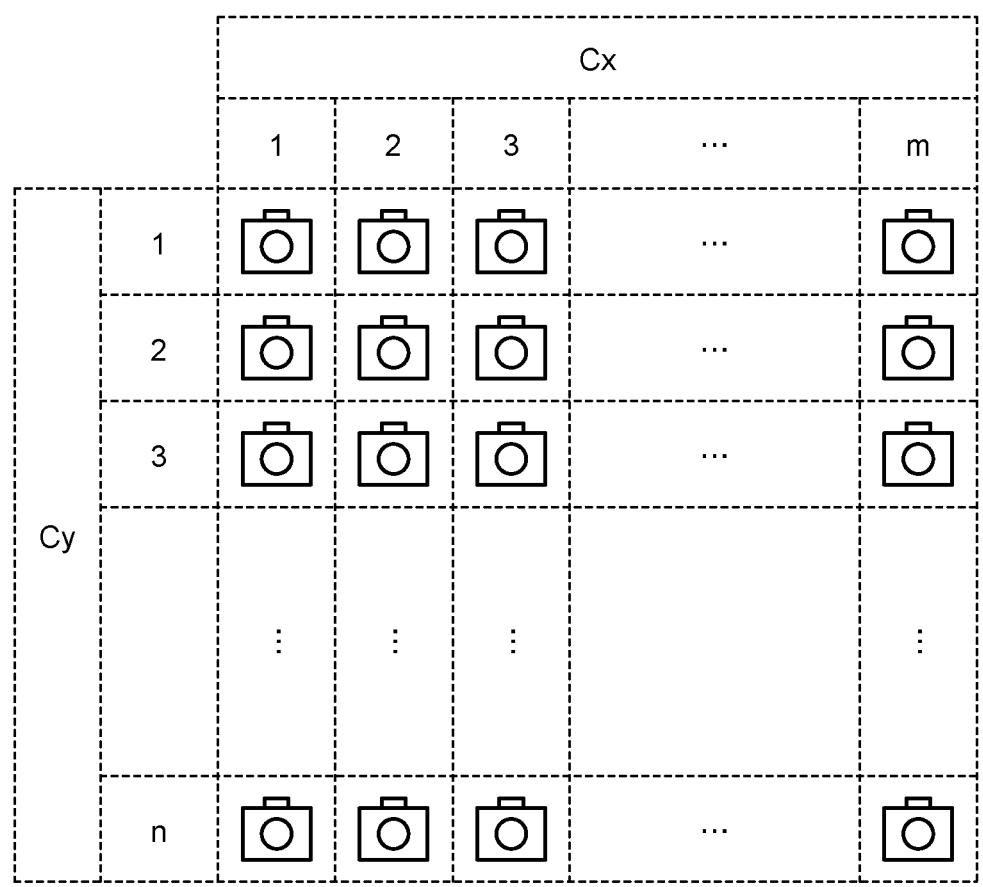
FIG. 8 is a schematic view illustrating an exemplary arrangement of image capturing devices when viewed from an object OB side.

FIG. 8 is a schematic view illustrating an exemplary arrangement of image capturing devices when viewed from the object OB side. As illustrated in FIG. 8, in the embodiment, a plurality of image capturing devices are arranged in a matrix of rows and columns when viewed from the object OB side. The number of image capturing devices arranged in the X direction in FIG. 8 is m and corresponds to FIG. 6. The number of image capturing devices arranged in the Y direction in FIG. 8 is n and corresponds to FIG. 7. When needed, a plurality of image capturing devices in the embodiment can be distinguished from one another by the coordinate number (any of 1 to m) in the X direction and the coordinate number (any of 1 to n) in the Y direction illustrated in FIG. 8. For example, an image capturing device as the image capturing device Cx(1) and the image capturing device Cy(1) is an image capturing device positioned at the upper-left corner in FIG. 8. FIG. 8 is merely a schematic diagram for easy understanding of disposition of a plurality of image capturing devices and does not reflect detailed aspects such as the orientations of the plurality of image capturing devices. In reality, the plurality of image capturing devices are each focused toward the object OB.

Figure 9:
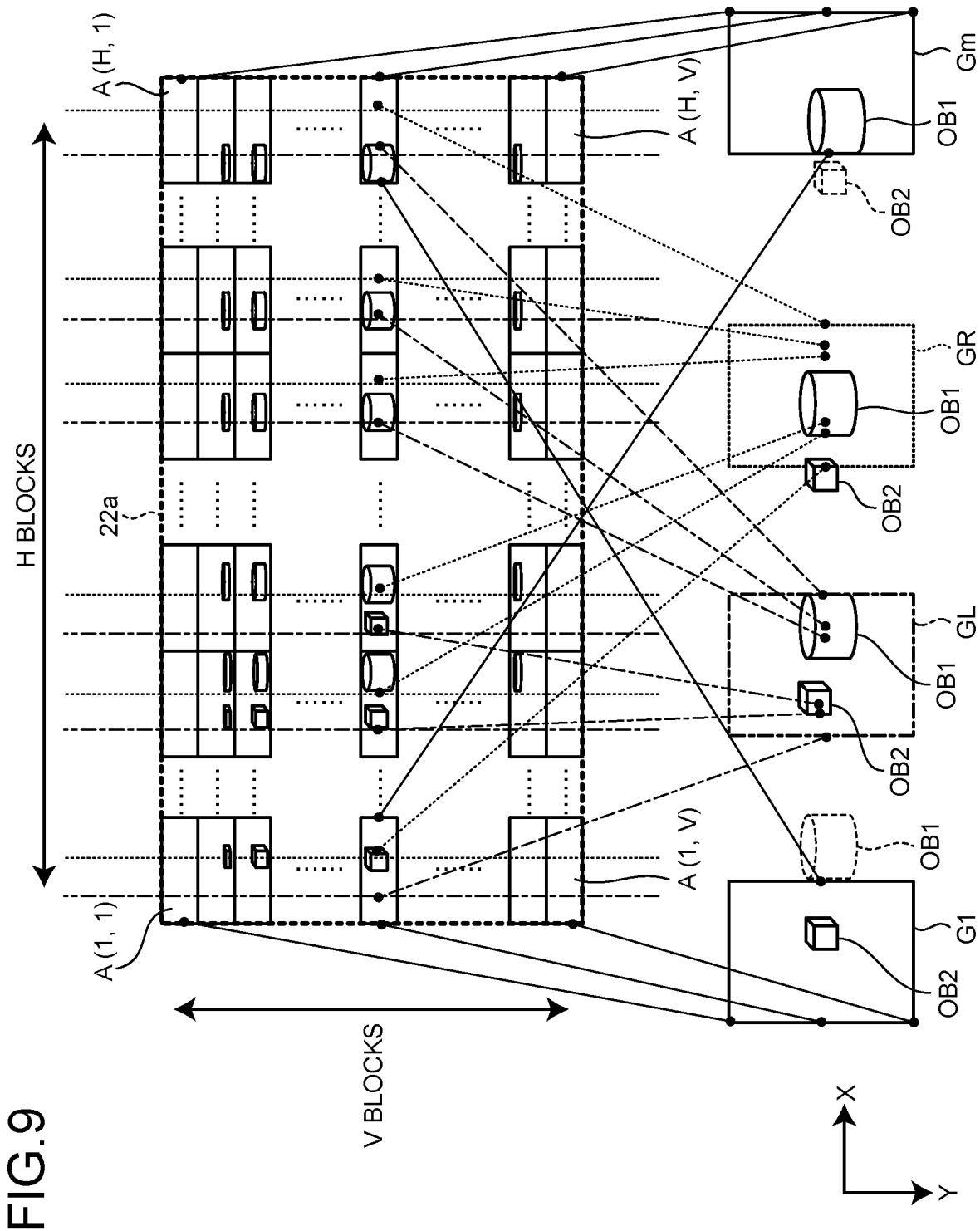
FIG. 9 is a schematic view illustrating an example of the content of parallax image data.

FIG. 9 is a schematic view illustrating an example of the content of the element image group 22a. The element image group 22a is image data for integral imaging 3D display described above with reference to FIG. 5 and is obtained by processing the original image group. As illustrated in FIG. 9, the element image group 22a includes a plurality of two-dimensionally disposed element images A.

More specifically, the element image group 22a illustrated in FIG. 9 includes H×V element images A disposed in a matrix of rows and columns. The numbers H and V are natural numbers of three or more. In the present embodiment, H and V are equal to the numbers of pixels in the X and Y directions, respectively, in an image captured by the above-described image capturing devices Cx and Cy. In other words, each original image is made up of H×V pieces of pixel data, and the element image group 22a includes H×V element images A in a number equal to the number of pixels of each image capturing device. FIG. 9 illustrates the position of each element image A in a coordinate system (A(h, v)) as combination of the X-directional positions of element images A arranged in H blocks and the Y-directional positions of element images A arranged in V blocks. The number h is a natural number equal to or smaller than H. The number v is a natural number equal to or smaller than V. For example, the symbol A(1, 1) indicates an element image A disposed on one end side in the X direction and one end side in the Y direction. The symbol A(H, V) indicates an element image A disposed on the other end side in the X direction and the other end side in the Y direction.

Although FIG. 9 illustrates the example in which the element image group 22a includes H×V element images A disposed in a matrix of rows and columns, the two-dimensional arrangement of element images A included in the element image group 22a is not limited to a matrix of rows and columns, and for example, the number of element images A arranged in the X direction on one side on a row of element images A adjacent to each other in the Y direction may be different from the number of element images A arranged in the X direction on the other side.

Figure 10:
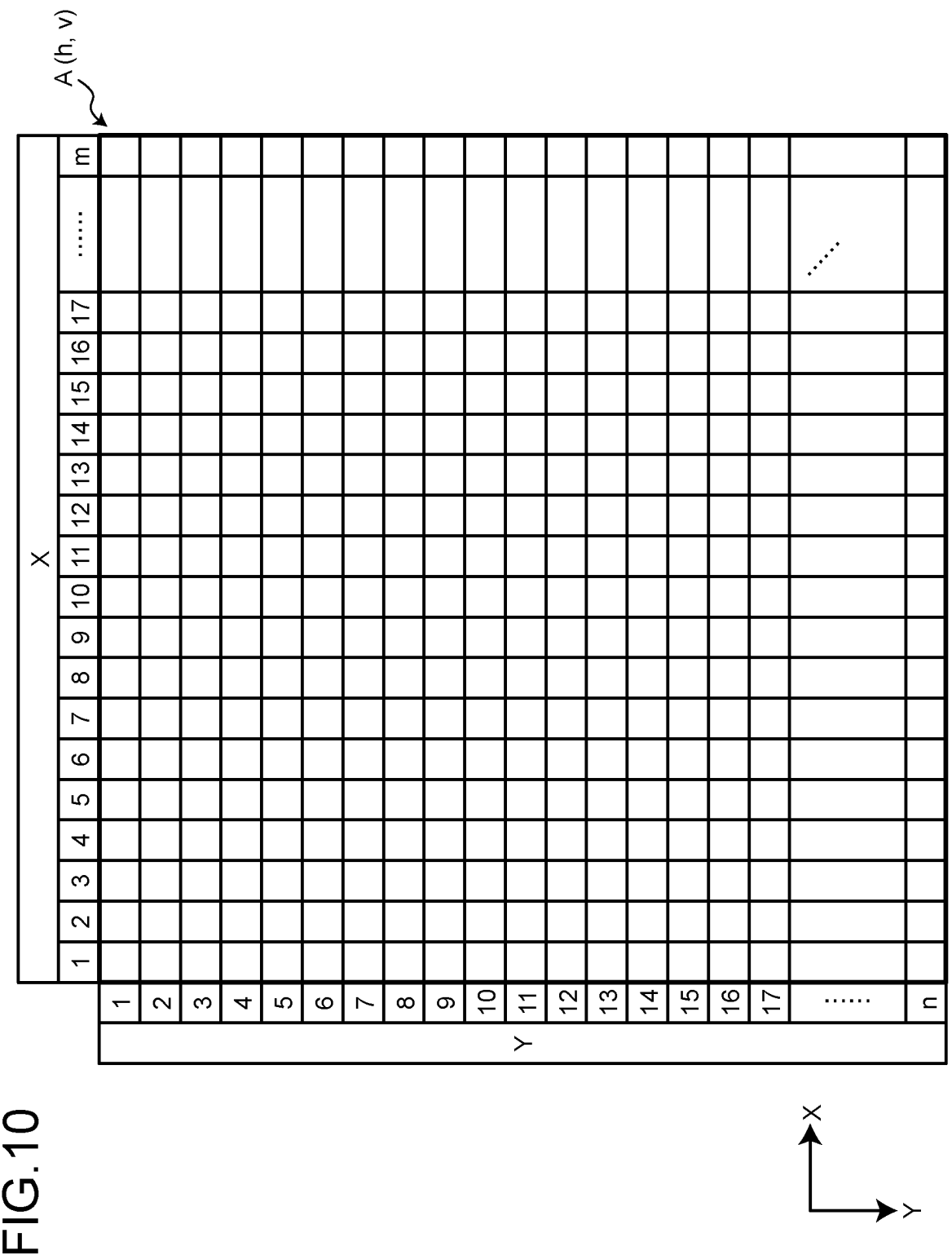
FIG. 10 is a schematic view illustrating the content of partial image data.

Element images A will be described below in more detail. FIG. 10 is a schematic view illustrating the content of one element image A(h, v). As illustrated in FIG. 10, the element image A(h, v) is image data in a matrix of rows and columns with m pieces of pixel data in the X direction and n pieces of pixel data in the Y direction. Hereinafter, a coordinate system (X, Y)=(α, β) indicates the position of pixel data included in the element image A(h, v). The number α is a natural number equal to or smaller than m. The number β is a natural number equal to or smaller than n. For example, pixel data of (X, Y)=(1, 1) means pixel data with X=1 and Y=1 in FIG. 10. Pixel data of (X, Y)=(m, n) means pixel data with X=m and Y=n in FIG. 10. The numbers (m, n) of pixels arranged in the X and Y directions, respectively, in the element image A(h, v) illustrated in FIG. 10 correspond to the numbers (m, n) of the plurality of image capturing devices arranged in the X and Y directions, respectively, which are described above with reference to FIG. 8. In a case where only some original images in the original image group are extracted to generate an element image group, the numbers (m, n) of arranged pixels in the X and Y directions, respectively, in the element image A(h, v) are smaller than the numbers (m, n) of the plurality of image capturing devices arranged in the X and Y directions, respectively, which are described above with reference to FIG. 8.

Pixel data at (X, Y)=(α, β) included in the element image A(h, v) is pixel data included in an original image captured by an image capturing device positioned at Cx(α) and Cy(β) among the image capturing devices Cx(1), . . . , Cx(m) (refer to FIG. 6) arranged in the X direction and among the image capturing devices Cy(1), . . . , Cy(n) (refer to FIG. 7) arranged in the Y direction.

Each of the plurality of image capturing devices disposed in a matrix of rows and columns in the X and Y directions and facing the object OB, which are described above with reference to FIGS. 6 and 7, generates image data in which H pieces of pixel data in the X direction and V pieces of pixel data in the Y direction are arranged in a matrix of rows and columns. Specifically, each of the plurality of image capturing devices includes an image capturing element capable of generating the image data. The element image A(1, 1) illustrated in FIG. 9 includes pixel data disposed on one end side in the X direction and one end side in the Y direction among H×V pieces of pixel data included in each of a plurality of original images generated by the respective image capturing devices.

For example, pixel data at (X, Y)=(1, 1) (refer to FIG. 10) among pixel data included in the element image A(1, 1) (refer to FIG. 9) is pixel data disposed on one end side in the X direction and one end side in the Y direction among H×V pieces of pixel data included in an original image captured by the image capturing device positioned as the image capturing device Cx(1) (refer to FIG. 6) and positioned as the image capturing device Cy(1) (refer to FIG. 7). For example, pixel data at (X, Y)=(m, n) (refer to FIG. 10) among pixel data included in the element image A(1, 1) (refer to FIG. 9) is pixel data disposed on one end side in the X direction and one end side in the Y direction among H×V pieces of pixel data included in an original image captured by the image capturing device positioned as the image capturing device Cx(m) (refer to FIG. 6) and positioned as the image capturing device Cy(n) (refer to FIG. 7).

Pixel data at (X, Y)=(1, 1) (refer to FIG. 10) among pixel data included in the element image A(H, V) (refer to FIG. 9) is pixel data disposed on the other end side in the X direction and the other end side in the Y direction among H×V pieces of pixel data included in an original image captured by the image capturing device positioned as the image capturing device Cx(1) (refer to FIG. 6) and positioned as the image capturing device Cy(1) (refer to FIG. 7). For example, pixel data at (X, Y)=(m, n) (refer to FIG. 10) among pixel data included in the element image A(H, V) (refer to FIG. 9) is pixel data disposed on the other end side in the X direction and the other end side in the Y direction among H×V pieces of pixel data included in an original image captured by the image capturing device positioned as the image capturing device Cx(m) (refer to FIG. 6) and positioned as the image capturing device Cy(n) (refer to FIG. 7). In other words, each element image A is an image reconstructed by collecting pixel data at each same coordinate position among image data captured by the image capturing devices Cx and Cy and arranging the pixel data in accordance with the arrangement order of the image capturing devices. This element image is used for screen display of integral imaging 3D display as described above.

Thus, image data obtained by extracting pixel data of (X, Y)=(α, β) from each of the plurality of element images A included in the element image group 22a illustrated in FIG. 9 and disposing the extracted pixel data in accordance with the arrangement of the plurality of element images A substantially matches an original image captured by the image capturing device positioned as the image capturing device Cx(α) and positioned as the image capturing device Cy(β). In other words, the original image is reproduced through recollection of the pixel data. Although the element image group 22a is image data as an assembly of element images A used for integral imaging 3D display, image data (in other words, original image) captured by an image capturing device C at a predetermined position can be acquired from the element image group 22a, for example, by the method as described above. FIG. 9 illustrates images G1, GL, GR, and Gm as examples of image data generated by the method.

The images G1, GL, GR, and Gm match original images generated by capturing the object OB at mutually different positions. Since the image capturing position and image capturing angle relative to the object OB are different between the images G1, GL, GR, and Gm, the appearances of the objects OB1 and OB2 are different between the images G1, GL, GR, and Gm. In other words, parallax is present among these pieces of image data. Thus, parallax 3D display can be performed, for example, when the image GL is visually recognized by the left eye EL of the user and the image GR is visually recognized by the right eye ER of the user. That is, in the present embodiment, parallax 3D display is achieved by developing image data of element images (group) used in the integral imaging method. For this reason, images used in the same manner as images (for example, the images G1, GL, GR, and Gm) described above for display on the display are also referred to as parallax images G below.

Hereinafter, a parallax image G means image data extracted from the element image group 22a and matching an original image captured by any of the plurality of image capturing devices arranged in a matrix of rows and columns in the X and Y directions and facing the object OB, which are described above with reference to FIGS. 6 and 7. Instead of being generated based on original images obtained from the above-described image capturing devices, the above-described element image group 22a may be generated based on images obtained from an optical system including a lens array including m×n lenses in front of one camera or may be obtained through arithmetic processing that assumes a virtual optical system in which the above-described image capturing devices are virtually disposed. For example, when the predetermined object OB is a 3D display target, the server 20 may store one or a plurality of element image groups 22a in the storage 22 through preparation in advance or arithmetic processing.

Figure 11:
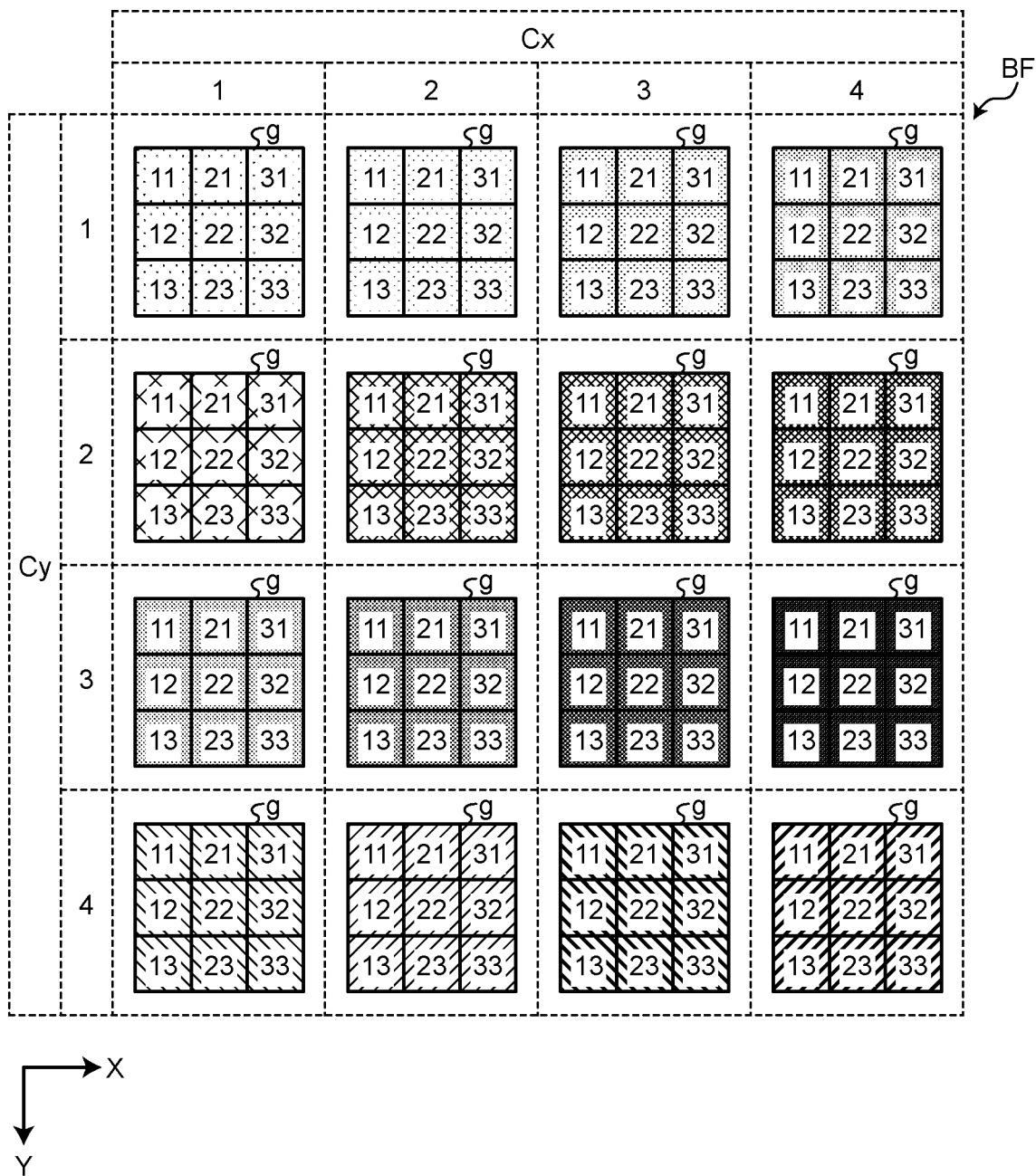
FIG. 11 is a schematic view illustrating a plurality of pieces of image data in a case of m=n=4.
Figure 12:
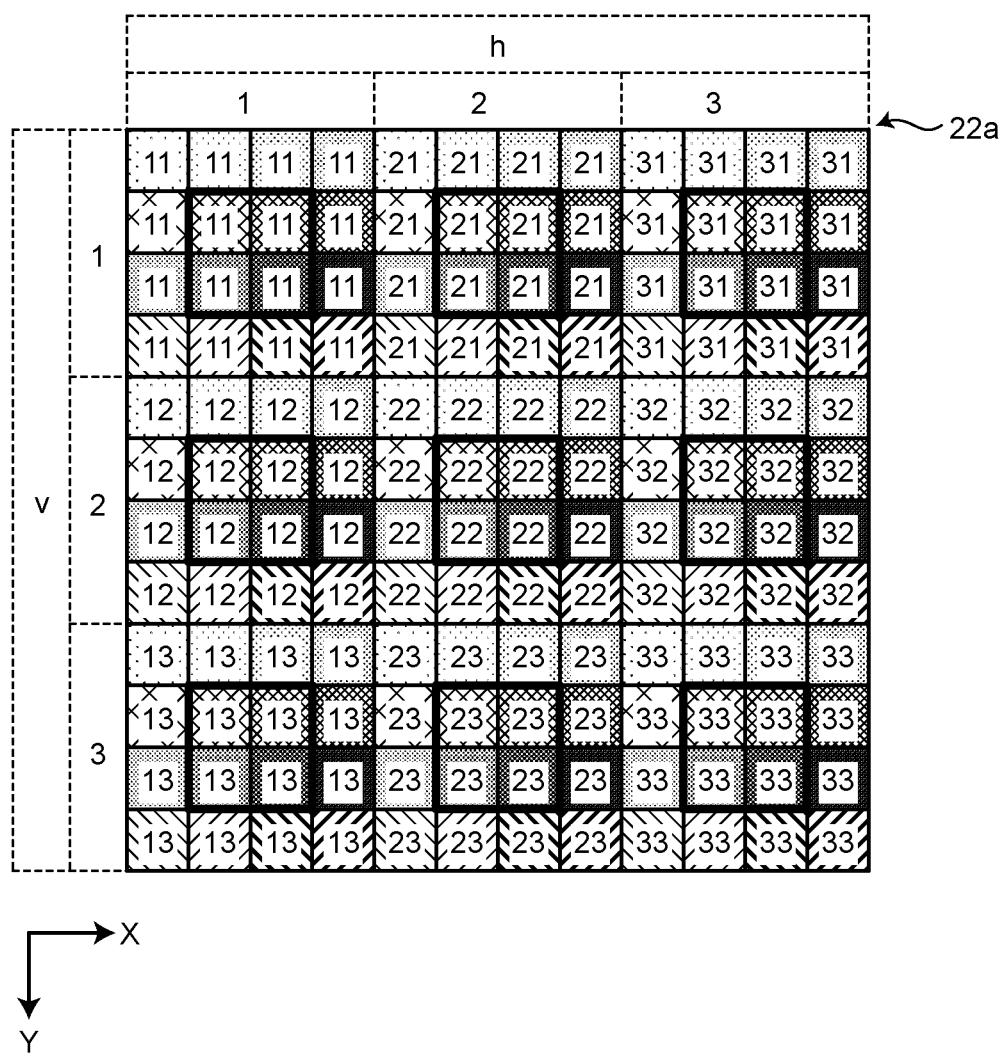
FIG. 12 is a schematic view illustrating parallax image data corresponding to the image data illustrated in FIG. 11.

The following describes, with reference to FIGS. 11 and 12, the relation between an original image g captured by each of the plurality of image capturing devices, the element image group 22a, the extracted element image group 22b, and a parallax image G using an example in which m=n=4. Specifically, the description is made with, as an example, a case where 4×4 (16) image capturing devices are arranged in a matrix of rows and columns in the X and Y directions for the object OB (refer to FIGS. 6 and 7).

Figure 14:
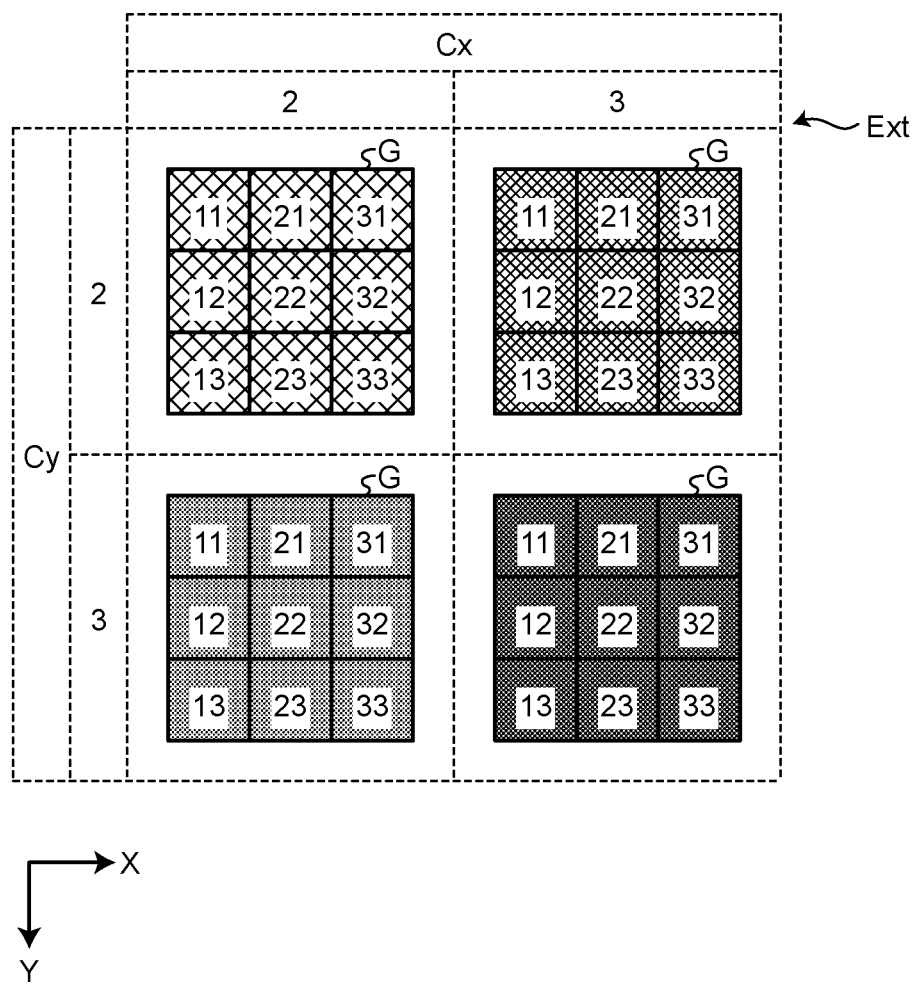
FIG. 14 is a schematic view illustrating image group data including image data reproduced from FIG. 13.

FIG. 11 is a schematic view illustrating an original image group BF in the case of m=n=4. In FIG. 11, for simplification of description, the original image g captured by each image capturing device is an original image g of 3×3=9 in which three pixels are arranged in the X direction and three pixels are arranged in the Y direction. In FIGS. 11 and 14, a pattern is provided for each original image g to facilitate understanding of how each pixel data of the original image g is collected at each process stage. In other words, rectangles with different patterns belong to the original images g captured by different image capturing devices. In addition, in FIGS. 11 and 12, nine rectangles (pixel images) included in each original image g are provided with different values, so that "the position of pixel data included in one original image g" can be distinguished. For example, a rectangle provided with "11" represents pixel data at the upper-left position in each original image g.

FIG. 12 is a schematic view illustrating the element image group 22a corresponding to the image data illustrated in FIG. 11. Combination of the coordinate h (any of 1 to 3) in the X direction and the coordinate v (any of 1 to 3) in the Y direction in FIG. 12 are values that can be applied to the coordinate system (h, v) of the element image A(h, v) described above with reference to FIGS. 9 and 10. For example, 16 rectangles included in the area with h=1 and v=1 in FIG. 12 represent pixel data included in the element image A(1, 1). The multiple pieces of pixel data included in the element image A(1, 1) are the respective pieces of pixel data at "11" in the original images g illustrated in FIG. 11. The arrangement of the multiple pieces of pixel data in the element image A(1, 1) corresponds to the coordinate system of the X and Y directions illustrated in FIG. 11, in other words, the arrangement of the plurality of image capturing devices. As indicated by the correspondence relation between FIGS. 11 and 12, pixel data included in the element image A(h, v) corresponds to the number and arrangement of image capturing devices described above with reference to FIGS. 6 to 8, which is the same as in the above description with reference to FIGS. 9 and 10.

The element image data transmitted from the server 20 to the terminal device 10 in the processing at step S25 described above with reference to FIG. 3 is the extracted element image group 22b as part of the element image group 22a. The following describes generation of the extracted element image group 22b with reference to FIG. 13, which corresponds to FIG. 12, as an example.

Figure 13:
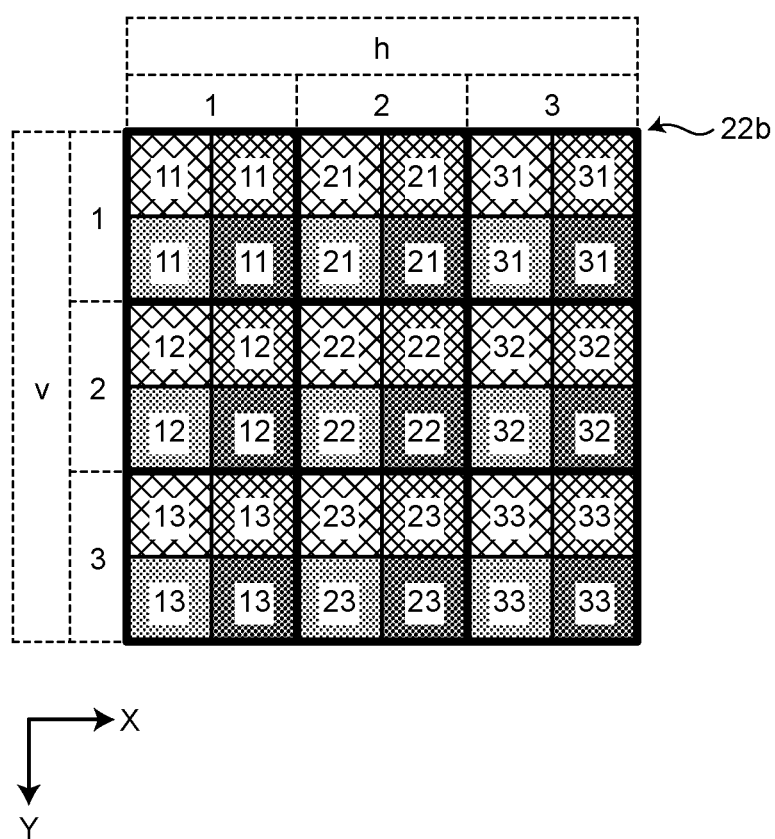
FIG. 13 is a schematic view illustrating an example of element image data.

FIG. 13 is a schematic view illustrating an example of the extracted element image group 22b. The extracted element image group 22b illustrated in FIG. 13 is a set of pixel data included in parts surrounded by bold frame lines in the element image A(h, v) illustrated in FIG. 12. The extracted element image group 22b corresponds to parallax images G of (Cx, Cy)=(2, 2), (3, 2), (2, 3), and (3, 3) when expressed in combination of the X-directional coordinate (Cx (any of 1 to 4)) and the Y-direction coordinate (Cy (any of 1 to 4)) for the plurality of image capturing devices in FIG. 11.

In the processing at step S24 (refer to FIG. 3), the server 20 performs processing of extracting the extracted element image group 22b from the element image group 22a. For example, the server 20 extracts the extracted element image group 22b illustrated in FIG. 13 in a case where the element image group 22a is configured as illustrated in FIG. 12 and the sight line information at the first time point, which is obtained in the processing at step S23, corresponds to the sight line information of the insides of areas with bold frames illustrated in FIG. 12. Specifically, the element image group 22a is a significantly large amount of data but is not all used for display at the terminal device 10. Thus, the server 20 extracts (selects), based on the sight line information at the first time point, only part of the element image group 22a that is needed in the relation with the sight line information, and then generates the extracted element image group 22b and transfers the extracted element image group 22b to the terminal device 10.

The terminal device 10 can perform processing of generating parallax images G by developing the extracted element image group 22b obtained in the processing at step S16 (refer to FIG. 3).

FIG. 14 is a schematic view illustrating the parallax image group Ext including parallax images G generated from FIG. 13. As described for the correspondence relation between FIGS. 12 and 13, the extracted element image group 22b illustrated in FIG. 13 includes pixel data of the original images g corresponding to (Cx, Cy)=(2, 2), (3, 2), (2, 3), and (3, 3). Thus, based on the relation between pixel data and each original image g described above with reference to FIGS. 9 and 10, the terminal device 10 can generate, from the extracted element image group 22b, parallax images G identical to the original images g corresponding to the above-described coordinates.

The above description with reference to the simplified examples illustrated in FIGS. 11 to 14 is made on how the extracted element image group 22b is configured and how the terminal device 10 generates a parallax image matching an original image from the extracted element image group 22b. The following describes image data (parallax image group Ext(θ°)) that is reproduced from the extracted element image group 22b by the terminal device 10 and is closer to the actual aspect, with reference to FIG. 15.

Figure 15:
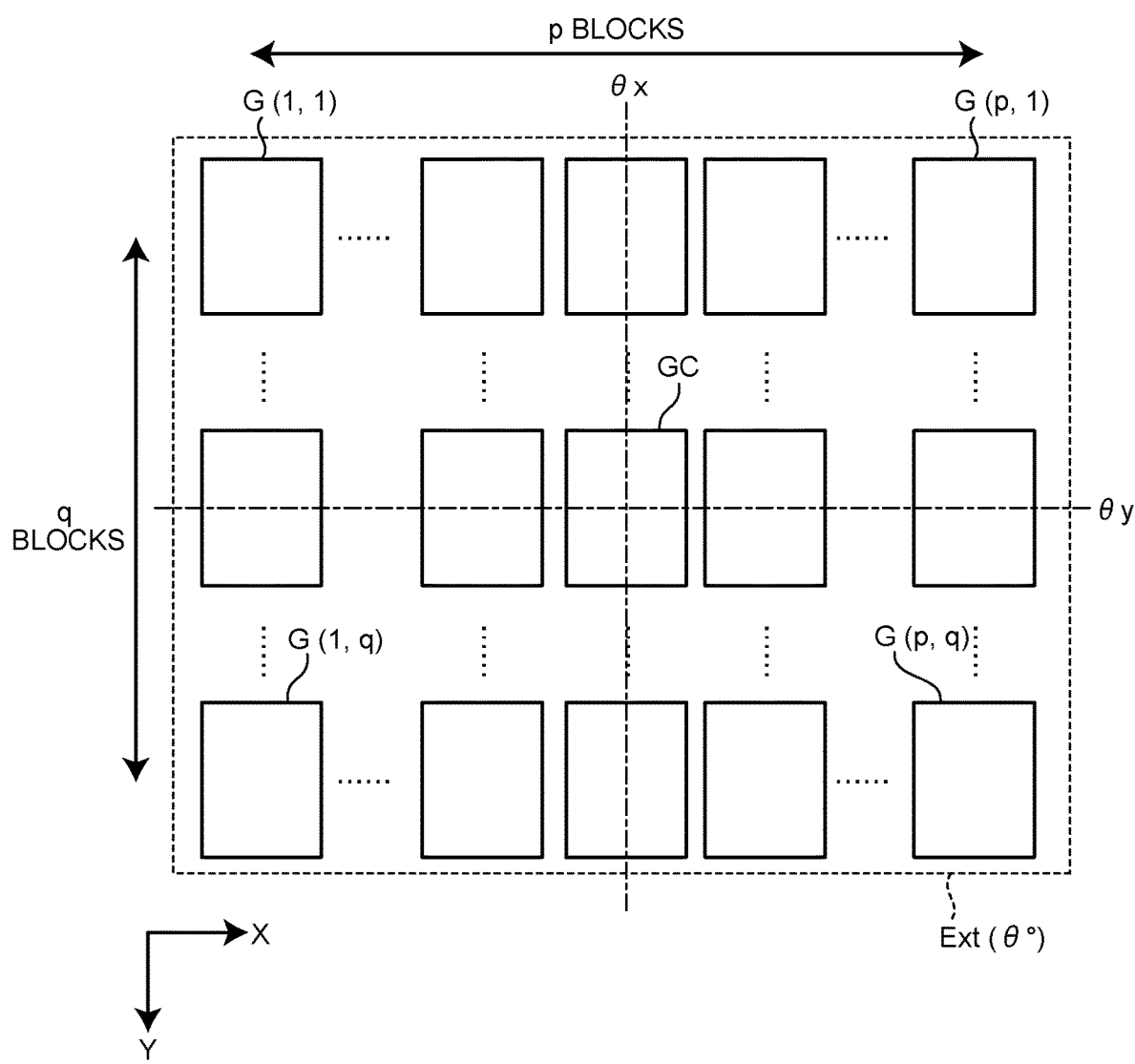
FIG. 15 is a schematic view illustrating an exemplary configuration of the image group data.

FIG. 15 is a schematic view illustrating an exemplary configuration of the parallax image group Ext(θ°). As illustrated in FIG. 15, the parallax image group Ext(θ°) includes p×q parallax images G arranged in a matrix of rows and columns. The numbers p and q are natural numbers of three or more. The number p is smaller than H. The number q is smaller than V. FIG. 15 illustrates the position of each parallax image group Ext(θ°) in a coordinate system (G(φ, ψ)) as combination of the X-directional positions of parallax images G arranged in p blocks and the Y-directional positions of parallax images G arranged in q blocks. The number φ is a natural number equal to or smaller than p. The number ψ is a natural number equal to or smaller than q. For example, the symbol G(1, 1) indicates a parallax image G disposed on one end side in the X direction and one end side in the Y direction. The symbol G(p, q) indicates a parallax image G disposed on the other end side in the X direction and the other end side in the Y direction.

The parallax image group Ext(θ°) is generated by developing the extracted element image group 22a extracted from the element image group 22a based on an angle θx in the X direction and an angle θy in the Y direction, and includes a plurality of parallax images G. The angle θx is a reference angle in the X direction among user's sight line angles (θ°) indicated by the sight line information transmitted from the terminal device 10 to the server 20 in the processing at step S12 (refer to FIG. 3) described above. The angle θy is an angle in the Y direction among user's sight line angles (θ°) indicated by the sight line information transmitted from the terminal device 10 to the server 20 in the processing at step S12 (refer to FIG. 3) described above.

As illustrated in, for example, FIGS. 18 and 21 to be described later, the display 15 (refer to FIGS. 1 and 2) has the image display surface 15a orthogonal to the X and Y directions and outputs an image from the image display surface 15a. The acquirer 11 derives the X-directional angle θx and the Y-directional angle θy as angles relative to a reference axis orthogonal to the image display surface 15a, in other words, a reference axis in the Z direction.

The image capturing devices Cx(1), ..., Cx(m) illustrated in FIG. 6 perform image capturing at mutually different image capturing angles (θx(1), ..., θx(m)) in the X direction. The image capturing devices Cy(1), ..., Cy(n) illustrated in FIG. 7 perform image capturing at mutually different image capturing angles (θy(1), ..., θy(n)) in the Y direction. The element image group 22a includes information indicating that an original image captured by the image capturing device positioned at Cx(α) and Cy(β) is image data corresponding to the angle θxα and the angle θyβ. Specifically, pixel data at (X, Y)=(α, β) is pixel data corresponding to the angle θxα and the angle θyβ. The parallax image group Ext(θ°) illustrated in FIG. 15 is generated by developing the extracted element image group 22b extracted from the element image group 22a in the processing at step S24 and transmitted from the server 20 to the terminal device 10 in the processing at step S25. In other words, the extracted element image group 22b is extracted from the element image group 22a to reproduce the parallax image group Ext(θ°) illustrated in FIG. 15.

For example, when the angle θx is the angle θxα and the angle θy is the angle θyβ, the parallax image group Ext(θ°) includes original images satisfying both a first condition and a second condition as follows. The first condition is inclusion in p image capturing devices arranged in the X direction with a center at Cx(α) among the image capturing devices Cx(1), ..., Cx(m). The second condition is inclusion in q image capturing devices arranged in the Y direction with a center at Cy(β) among the image capturing devices Cy(1), ..., Cy(n). In this case, a parallax image GC illustrated in FIG. 15 is an original image captured by the image capturing device positioned at Cx(α) and Cy(β). As indicated in this example, the parallax image group Ext(θ°) includes p×q pieces of image data captured by p image capturing devices in the X direction and q image capturing devices in the Y direction with a center at an image capturing device having generated image data corresponding to the angle θx and the angle θy. Alternatively, the calculator (in other words, extractor) operating in cooperation with the extraction program 22p of the server extracts, from the element image group 22a, pixel data including a pixel image of an original image corresponding to the angle θx and the angle θy and pixel images of p original images in the X direction and q original images in the Y direction with the original image as a center and arranges the pixel data, thereby generating the extracted element image group 22b.

The image capturing angle of a particular original image does not necessarily match the angle θx and the angle θy. In such a case, in the processing at step S24 (refer to FIG. 3), the extractor 25 (refer to FIG. 2) regards and selects, as an image corresponding to the parallax image GC (refer to FIG. 15), an original image with an image capturing angle closest to the angle θx among image capturing angles (θx1, ..., θxm) and closest to the angle θy among image capturing angles (θy1, ..., θyn). However, the extractor 25 does not regard, as the angle θx, an image capturing angle closest to the angle θx among the image capturing angles (θx1, ..., θxm) nor regard, as the angle θy, an image capturing angle closest to the angle θy among the image capturing angles (θy1, ..., θyn). The angles θx and θy are managed separately from the image capturing angle of an image capturing device having generated the parallax image GC.

When p is an even number, the parallax image GC in the parallax image group Ext(θ°) (refer to FIG. 15) including p×q pieces of image data is not positioned at the center in the X direction as illustrated in FIG. 15 but is positioned one block away from the center in the X direction on one end side or the other end side of the center in the X direction. When the parallax image GC is positioned on one end side in the X direction, the parallax image group Ext(θ°) includes image data captured by {(p/2)−1} image capturing devices continuously arranged on one end side in the X direction from the image capturing device having generated the parallax image GC as a reference and by {(p/2)} image capturing devices continuously arranged on the other end side in the X direction from the reference. When the parallax image GC is positioned on the other end side in the X direction, the parallax image group Ext(θ°) includes image data captured by {(p/2)} image capturing devices continuously arranged on one end side in the X direction from the image capturing device having generated the parallax image GC as a reference and by {(p/2)−1} image capturing devices continuously arranged on the other end side in the X direction from the reference. The same configuration is applied to the Y-directional arrangement of the parallax image GC and q pieces of image data included in the parallax image group Ext(θ°) when q is an even number.

The parallax image GC serves as image data corresponding to a reference angle (θ°) at a time point (the first time point) at which the extracted element image group 22b as a source of the parallax image group Ext is extracted. A plurality of pieces of image data other than the parallax image GC included in the parallax image group Ext function as a plurality of pieces of image data corresponding to angles obtained by adding or subtracting mutually different error angles to or from the reference angle at the first time point.

Although values in the embodiment are, for example, m=32, n=32, H=246, V=432, p=16, q=5, these specific values are merely exemplary, and the present disclosure is not limited thereto and the values are changeable as appropriate.

The following describes, with reference to FIGS. 16 to 23, an example of the relation between: a sight line angle indicated by the sight line information transmitted from the terminal device 10 to the server 20 in the processing at step S12 described above with reference to FIG. 3; the parallax image group Ext reproduced based on the extracted element image group 22b extracted from the element image group 22a in the processing at step S24; and the display data selected from the parallax image group Ext in the processing at step S18.

Figure 16:
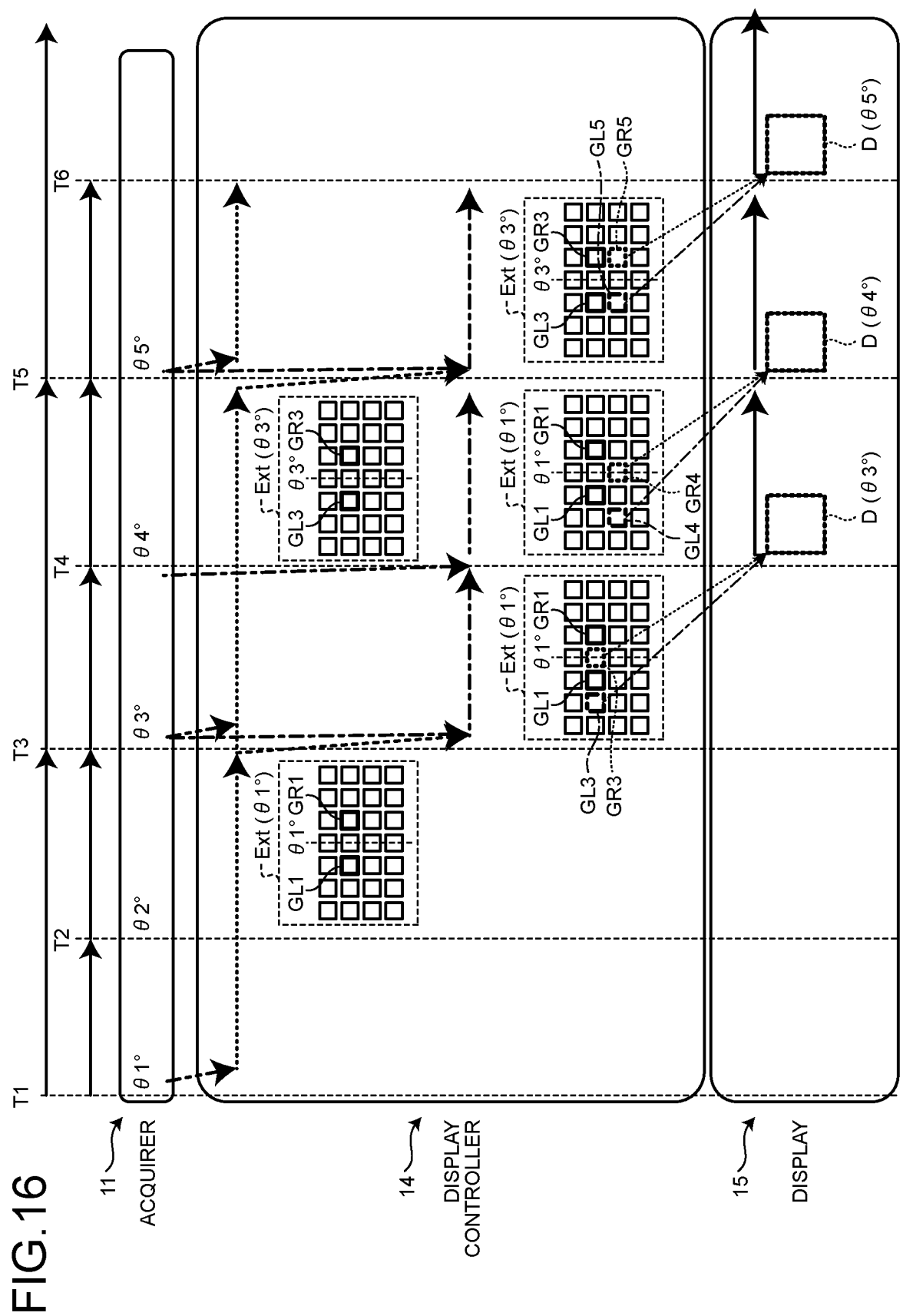
FIG. 16 is a time chart schematically illustrating the process of information processing performed in the display system.
Figure 25:
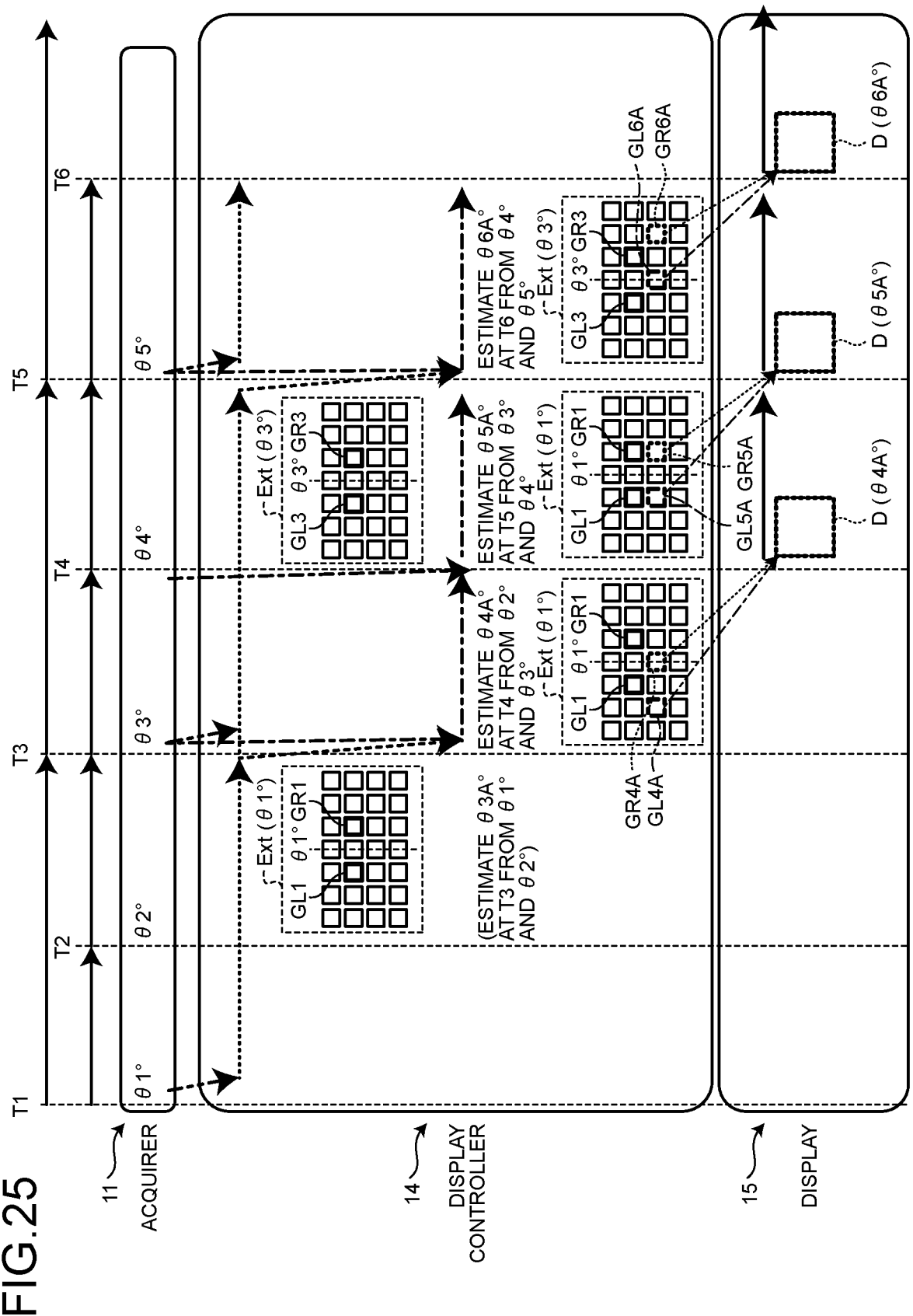
FIG. 25 is a time chart schematically illustrating the process of information processing performed in a display system according to a modification.

FIG. 16 is a time chart schematically illustrating the process of information processing performed in the display system 1. In FIG. 16 and FIG. 25 to be described later, a timing T1 is a start timing of information processing performed in the display system 1.

First, at the timing T1, the processing at step S11 (refer to FIG. 3) is performed. Specifically, the acquirer 11 acquires the sight line information at the timing T1. The processing at step S11 is performed at the first period as described above. In FIGS. 16 and 25, the first period is illustrated as timings T1, T2, T3, T4, T5, T6, . . . . In FIGS. 16 and 25, the pieces of sight line information acquired at the timings T1, T2, T3, T4, and T5 are respectively denoted by θ1°, θ2°, θ3°, θ4°, and θ5°. Each of θ1°, θ2°, θ3°, θ4°, and θ5° includes information indicating the angle θx and information indicating the angle θy as described above (refer to FIG. 15).

The transmission of the sight line information from the terminal device 10 to the server 20 in the processing at step S12 (refer to FIG. 3) is performed at the second period. In FIGS. 16 and 25, the second period is illustrated as the timings T1, T3, and T5, . . . . Specifically, the second period has a longer interval than the first period. In FIGS. 16 and 25, the transmission of the sight line information (θ1°, θ3°, and θ5°) acquired at each of the timings T1, T3, and T5 from the terminal device 10 to the server 20 in the processing at step S12 is illustrated with an arrow of a dashed and double-dotted line from the acquirer 11 to the extractor 25.

As described above for the processing at step S24 (refer to FIG. 3), the extractor 25 generates the extracted element image group 22b as a source of the parallax image group Ext based on the element image group 22a, based on the sight line information (θ1°) transmitted in the processing at step S12 and received in the processing at step S23. The extracted element image group 22b is transmitted from the server 20 to the terminal device 10 in the processing at step S25. Such extraction and transmission of the extracted element image group 22b are performed each time the processing at step S23 is performed. In FIG. 16 and FIG. 25 to be described later, the transmission of the extracted element image group 22b is illustrated with an arrow from the acquirer 11 to the display 15.

FIGS. 16 and 25 exemplify a parallax image group Ext(θ1°) that is the parallax image group Ext reproduced from the extracted element image group 22b generated based on the sight line information (θ1°) acquired by the acquirer 11 at the timing T1, and a parallax image group Ext(θ3°) that is the parallax image group Ext reproduced from the extracted element image group 22b generated based on the sight line information (θ3°) acquired by the acquirer 11 at the timing T3. The extraction of the parallax image group Ext based on the sight line information is completed before the second period elapses after reception of the sight line information. In other words, extraction of element image data based on the previous sight line information is completed before reception of the next sight line information.

The transmission of the extracted element image group 22b from the server 20 to the terminal device 10 in the processing at step S25 (refer to FIG. 3) and the reception of the extracted element image group 22b in the processing at step S16 are performed at the second period or an interval based on the second period. The development of the parallax image group Ext from the extracted element image group 22b is performed before the processing at step S19 after the processing at step S16. FIGS. 15 and 25 illustrate an example in which reproduction of the parallax image group Ext(θ1°) is performed around the timing T3 and reproduction of the parallax image group Ext(θ3°) is performed around the timing T5.

Acquisition of sight line information (θ3°) by the acquirer 11 at the timing T3 is performed in parallel with completion of developing the parallax image group Ext(θ1°) by the terminal device 10. Hereinafter, the sight line information (θ1°) referred when the extracted element image group 22b as a source of the parallax image group Ext(θ1°) is extracted from the element image group 22a is referred to as the sight line information at the first time point (in this example, the timing T1). In this case, the terminal device 10 acquires the sight line information (θ3°) at the second time point (in this example, the timing T3), which is later than the first time point, through the acquirer 11 when reception of the extracted element image group 22b as a source of the parallax image group Ext(θ1°) based on the sight line information at the first time point is completed. It can be understood that, although the sight line is θ3 at the time point of the reception, the sight line center of the parallax image group Ext received and developed corresponds to (θ1). Thus, in the processing at step S18 (refer to FIG. 3), the display controller 14 selects, based on the sight line information (θ3°) at the second time point, parallax images G corresponding to the sight line information (θ3°) at the second time point from the parallax image group Ext(θ1°) based on the sight line information at the first time point. Accordingly, second sight line information, in other words, appropriate parallax images (first parallax image GR3 and second parallax image GL3) based on the latest sight line information are selected from the parallax image group Ext based on the sight line information at the first time point.

In FIG. 16, pieces of image data selected as parallax images constituting display data in the parallax image group Ext(θ1°) are indicated as the first parallax image GR1 and the second parallax image GL1 as long as the selection is based on the sight line information (θ1°) at the first time point (in this example, the timing T1). In addition, pieces of image data selected as parallax images constituting display data selected based on the sight line information (θ3°) at the second time point (in this example, the timing T3) later than the first time point in the processing at step S18 are indicated as the first parallax image GR3 and the second parallax image GL3. Such selection is performed in the period of time between the timings T3 and T4. In the processing at step S19, the display 15 displays, in the period of time between the timings T4 and T5, display data based on the first parallax image GR3 and the second parallax image GL3 thus selected by the display controller 14. Specifically, at the timing T4 at which output based on the parallax image group Ext(θ3°) still cannot be performed, the display 15 can perform output of display data D(θ3°) corresponding to viewpoint information at the timing T3 from the parallax image group Ext(θ1°) corresponding to the sight line information at the timing T1.

Subsequently, the acquirer 11 acquires the sight line information (θ4°) at the timing T4 after the terminal device 10 completes reception of the extracted element image group 22b as a source of the parallax image group Ext(θ1°). Hereinafter, the sight line information (θ1°) referred when the extracted element image group 22b as a source of the parallax image group Ext(θ1°) is extracted from the element image group 22a is referred to as the sight line information at the first time point (in this example, the timing T1). In this case, the terminal device 10 acquires the sight line information (θ4°) at the second time point (in this example, the timing T4), which is later than the first time point, through the acquirer 11 when reception of the extracted element image group 22b as a source of the parallax image group Ext(θ1°) based on the sight line information at the first time point is completed. In the processing at step S18 (refer to FIG. 3), the display controller 14 selects, based on the sight line information (θ4°) at the second time point, parallax images G corresponding to the sight line information (θ4°) at the second time point from the parallax image group Ext(θ1°) based on the sight line information at the first time point. Accordingly, appropriate parallax images (the first parallax image GR4 and the second parallax image GL4) based on the second sight line information, in other words, the latest sight line information are selected from the parallax image group Ext based on the sight line information at the first time point.

In FIG. 16, pieces of image data selected as image data constituting display data selected based on the sight line information (θ4°) at the second time point (in this example, the timing T4) later than the first time point in the processing at step S18 are indicated as the first parallax image GR4 and the second parallax image GL4. Such selection is performed in the period of time between the timings T4 and T5. In the processing at step S19, the display 15 displays, in the period of time between the timings T5 and T6, display data based on the first parallax image GR4 and the second parallax image GL4 thus selected by the display controller 14.

Acquisition of the sight line information (θ5°) by the acquirer 11 at the timing T5 is performed in parallel with completion of reception of the extracted element image group 22b as a source of the parallax image group Ext(θ3°) by the terminal device 10. Hereinafter, the sight line information (θ3°) referred when the extracted element image group 22b as a source of the parallax image group Ext(θ3°) is extracted from the element image group 22a is referred to as the sight line information at the first time point (in this example, the timing T3). In this case, the terminal device 10 acquires the sight line information (θ5°) at the second time point (in this example, the timing T5), which is later than the first time point, through the acquirer 11 when reception of the extracted element image group 22b as a source of the parallax image group Ext(θ3°) based on the sight line information at the first time point is completed. In the processing at step S18 (refer to FIG. 3), the display controller 14 selects, based on the sight line information (θ5°) at the second time point, display data corresponding to the sight line information (θ5°) at the second time point from the parallax image group Ext(θ3°) based on the sight line information at the first time point. Accordingly, appropriate parallax images (a first parallax image GR5 and a second parallax image GL5) based on the second sight line information, in other words, the latest sight line information are selected from the parallax image group Ext based on the sight line information at the first time point.

In FIG. 16, pieces of image data selected as image data constituting display data in the parallax image group Ext (θ3°) are indicated as the first parallax image GR3 and the second parallax image GL3 as long as the selection is based on the sight line information (θ3°) at the first time point (in this example, the timing T3). In addition, pieces of image data selected as image data constituting display data selected based on the sight line information (θ5°) at the second time point (in this example, the timing T5) later than the first time point in the processing at step S18 are indicated as the first parallax image GR5 and the second parallax image GL5. Such selection is performed in the period of time between the timings T5 and T6. In the processing at step S19, the display 15 displays, in the period of time following the timing T6, display data based on the first parallax image GR5 and the second parallax image GL5 thus selected by the display controller 14. In this manner, an appropriate parallax image group Ext based on the second sight line information can be selected.

In a case where the display system 1 continues operating after the timing T6, although not illustrated, acquisition of the sight line information by the acquirer 11 at the first period, transmission and reception of the sight line information at the second period, extraction of element image data as a source of the parallax image group Ext based on the sight line information by the extractor 25 at the first time point, reproduction of the parallax image group Ext from the extracted element image group 22b, selection of display data from the parallax image group Ext based on the sight line information at the second time point by the display controller 14, and output of display data by the display 15 are repeatedly performed.

The following describes more detailed matters of the sight line information, display data included in the parallax image group Ext, and selection of display data by the display controller 14 with reference to FIGS. 17 to 23. For simplification of description, it is assumed that only change of the X-directional sight line angle occurs between the sight line information (θ1°) at the timing T1 and the sight line information (θ3°) at the timing T3.

Figure 17:
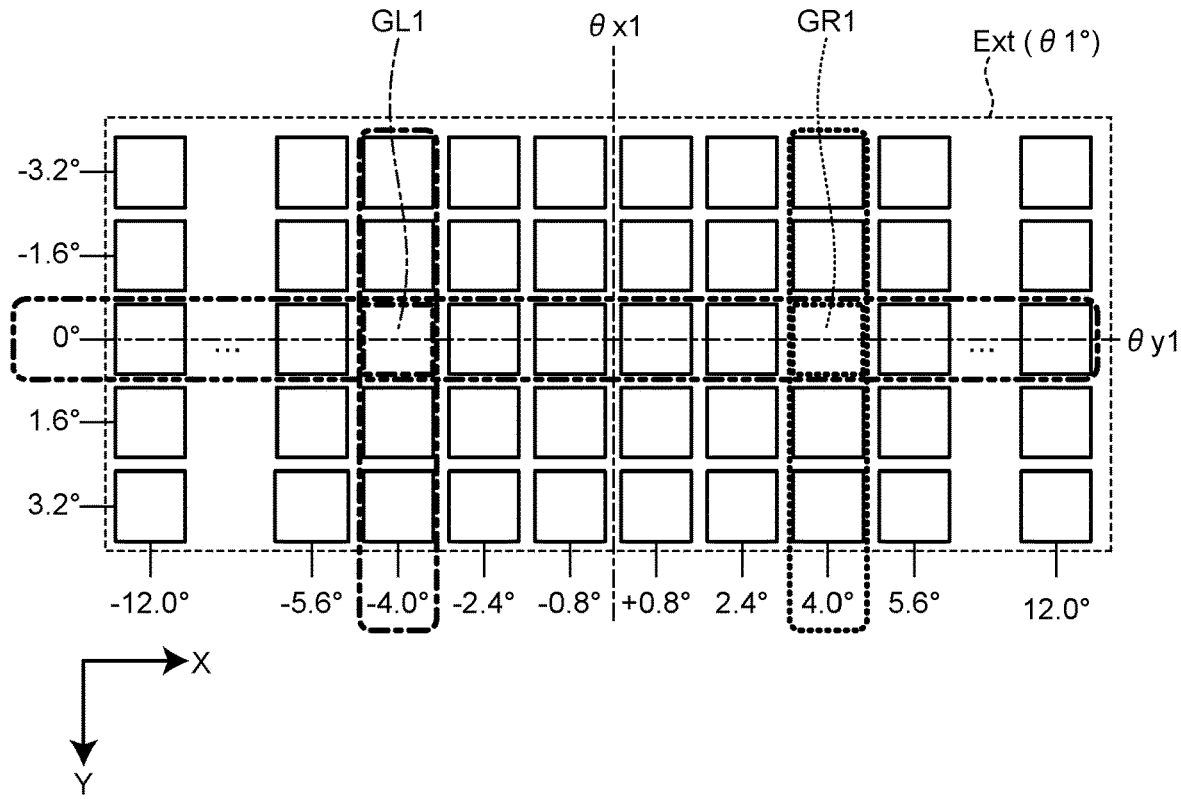
FIG. 17 is a schematic view illustrating an example of the relation between image data included in image group data Ext($\theta1°$) and a first parallax image GR1 and a second parallax image GL1 both of which are selected as display data based on sight line information ($\theta1°$) at a first time point.

FIG. 17 is a schematic view illustrating an example of the relation between: parallax images (in other words, original images) included in the parallax image group Ext(θ1°); and the first parallax image GR1 and the second parallax image GL1 selected as display data based on the sight line information (θ1°) at the first time point. FIG. 18 is a schematic view illustrating an example of the relation between the X-directional angle (θx1) indicated by the sight line information (θ1°) at the first time point and the positions of the user's eyes at the first time point.

As described above with reference to FIG. 15, the parallax image group Ext such as the parallax image group Ext(θ1°) includes a plurality of parallax images (in other words, original images) with a center at the X-directional angle θx and the Y-directional angle θy. In FIG. 17 and other figures, the X-directional angle θx at the time point (first time point) at which the extracted element image group 22b as a source of the parallax image group Ext(θ1°) is extracted is indicated as the angle θx1. In addition, the Y-directional angle θy at the first time point is indicated as the angle θy1. When the center is defined as the angle of 0° in the X direction and 0° in the Y direction, the parallax image group Ext illustrated in FIG. 17 covers the sight line of the user in the angle range of ±12° in the X direction and ±3.2° in the Y direction by including the plurality of pieces of image data. In other words, the parallax image group Ext according to the embodiment includes images that the user can visually recognize by changing the sight line angle in the angle range of ±12° in the X direction and ±3.2° in the Y direction with a center at a sight line angle indicated by the user's sight line information at the first time point. In other words, the extractor 25 of the server 20 generates the extracted element image group 22b based on the sight line information so that a pair of pieces of parallax image data (for example, the first parallax image GR1 and the second parallax image GL1 illustrated in FIG. 17) constantly remain at positions.

In the embodiment, the sight line information is derived by assuming that the image display surface 15a of the display 15 is viewed by the right eye ER and the left eye EL included in a user's face image captured by the image capturing device 11a of the acquirer 11. Specifically, the acquirer 11 according to the embodiment derives the sight line information based on the disposition and view angle of the image capturing device 11a, which are predetermined by designing the terminal device 10, and the positional relation with the image display surface 15a by assuming that the focal point of the right eye ER and the left eye EL included in the user's face image converges on the image display surface 15a.

Figure 18:
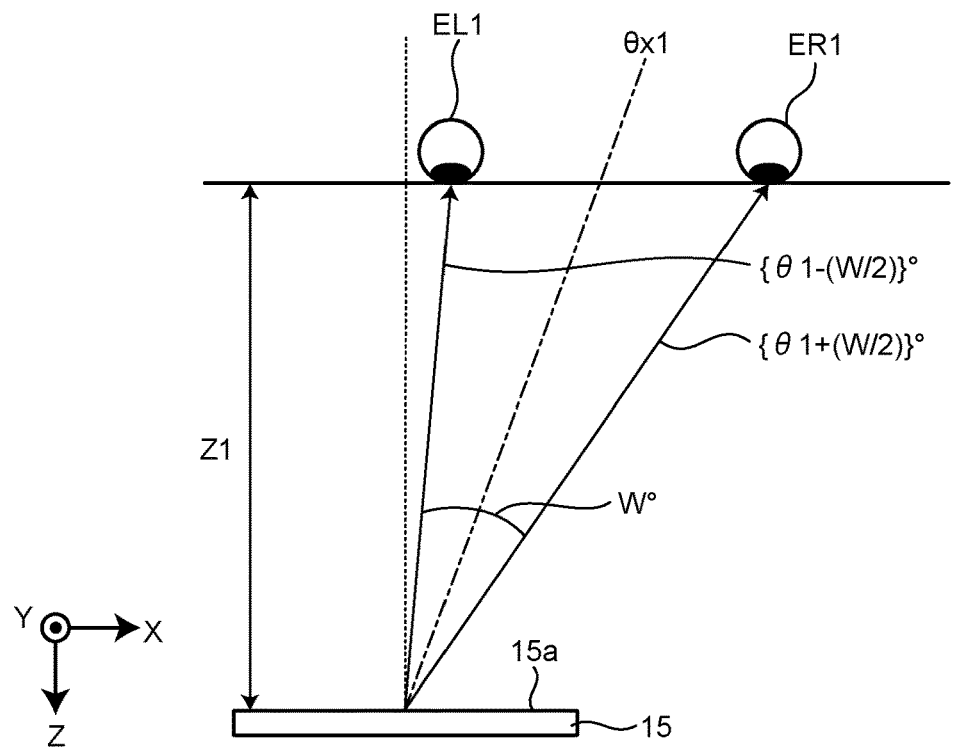
FIG. 18 is a schematic view illustrating an example of the relation between an X-directional angle ($\theta x1$) indicated by sight line information ($\theta1°$) at the first time point and positions of user's eyes at the first time point.
Figure 20:
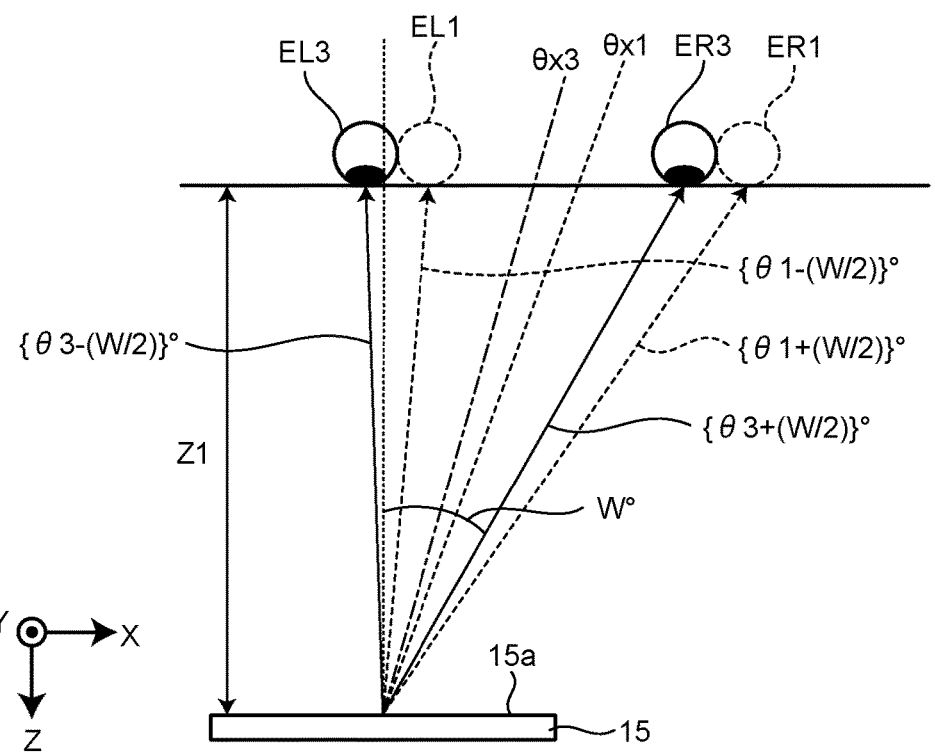
FIG. 20 is a schematic view illustrating an example of the relation between: a sight line angle ($\theta x1$) indicated by the sight line information ($\theta1°$) at the first time point and the positions of the user's eyes at the first time point; and a sight line angle (θx3) indicated by the sight line information (θ3°) at the second time point and the positions of the user's eyes at the second time point.

In FIG. 18 and FIG. 20 to be described later, the X-directional angle θx1 indicated by the user's sight line information (θ1°) at the time point (first time point) at which the extracted element image group 22b as a source of the parallax image group Ext(θ1°) is extracted, indicates a state in which the user views the X-directional central point of the image display surface 15a of the display 15. In FIGS. 18 and 20, the positions of the right eye ER and left eye EL of the user in this case are illustrated as a right eye ER1 and a left eye EL1.

As illustrated in FIGS. 18 and 20, the X-directional angle θx1 indicated by the user's sight line information (θ1°) is the angle between a reference line and the Z direction. The reference line is a straight line connecting a middle point CP (refer to FIG. 25) between the right eye ER1 and the left eye EL1 in the X direction to the focal point of the right eye ER1 and the left eye EL1. With the reference line as a center, an angle W° is formed between a straight line connecting the focal point and the right eye ER1 and a straight line connecting the focal point and the left eye EL1. In FIGS. 18 and 20, the straight line connecting the focal point and the right eye ER1 is illustrated as a straight line of {θ1+(W/2)}°. In addition, the straight line connecting the focal point and the left eye EL1 is illustrated as a straight line of {θ1−(W/2)}°.

As described above, an image corresponding to the X-directional center and included in the parallax image group Ext corresponds to the X-directional angle θx1 indicated by the user's sight line information (θ1°). However, the sight line angle of the right eye ER1 is not the angle θx1 but is {θ1+(W/2)}°. Furthermore, the sight line angle of the left eye EL1 is {θ1−(W/2)}°. When such a relation between the X-directional angle θx1 indicated by the sight line information (θ1°) and the sight line angle of each of the right eye ER1 and the left eye EL1 is considered, output individually corresponding to the sight line angle of each of the right eye ER1 and the left eye EL1 needs to be performed for visual recognition of a parallax 3D image by the user. Thus, as illustrated in FIG. 17 and other figures, the first parallax image GR1 selected with an assumption of visual recognition by the right eye ER1 is not image data at a position directly corresponding to the angle θx1 but is image data at a position shifted from the angle θx1 by a predetermined angle (for example, 4.0°) on one side in the X direction. The second parallax image GL1 selected with an assumption of visual recognition by the left eye EL1 is not image data at a position directly corresponding to the angle θx1 but is image data at a position shifted from the angle θx1 by a predetermined angle (for example, −4.0°) on the other side in the X direction. The display controller 14 according to the embodiment includes a circuit, a computer program, or the like implementing an algorithm that can derive {θ1±(W/2)} from the angle θx1.

Figure 19:
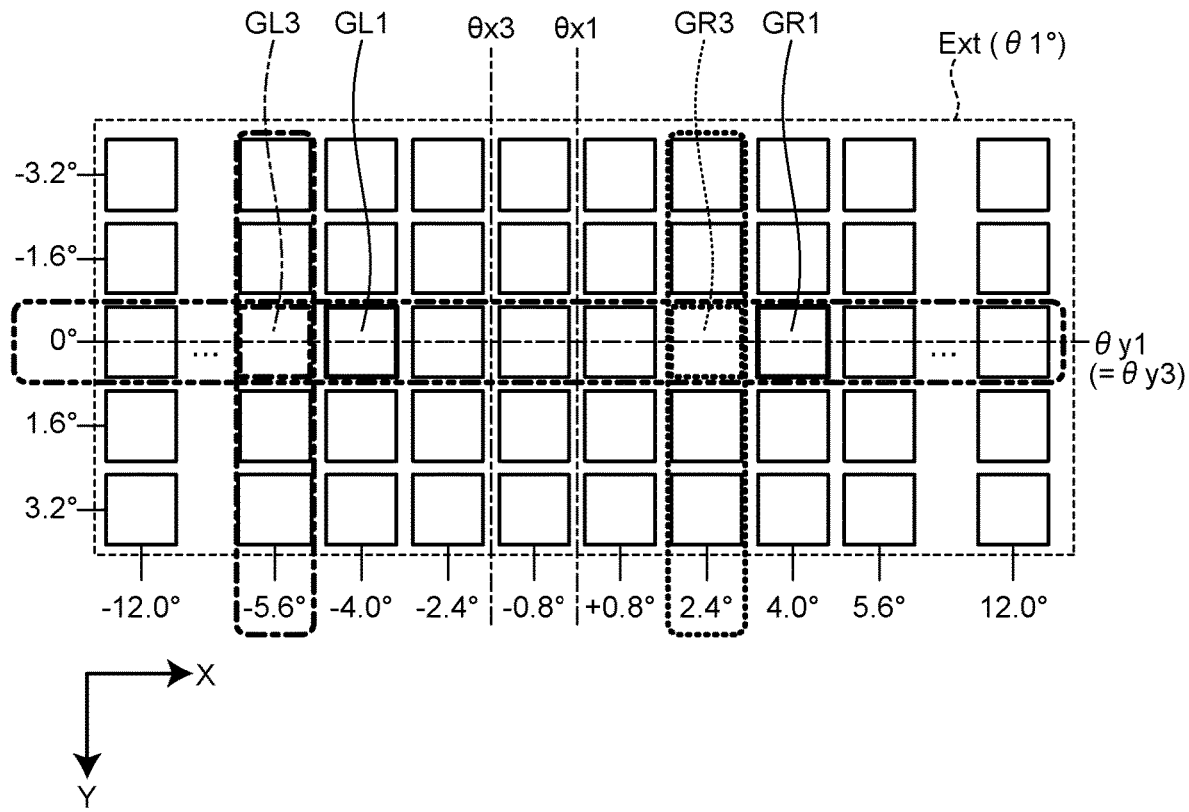
FIG. 19 is a schematic view illustrating an example of the relation between a plurality of pieces of image data included in the image group data Ext($\theta1°$), the first parallax image GR1 and the second parallax image GL1 selected as display data based on the sight line information ($\theta1°$) at the first time point, and a first parallax image GR3 and a second parallax image GL3 selected as display data based on sight line information ($\theta3°$) at a second time point.

FIG. 19 is a schematic view illustrating an example of the relation between the plurality of parallax images (in other words, original images) included in the parallax image group Ext(θ1°), the first parallax image GR1 and the second parallax image GL1 selected as display data based on the sight line information (θ1°) at the first time point, and the first parallax image GR3 and the second parallax image GL3 selected as display data based on the sight line information (θ3°) at the second time point. FIG. 20 is a schematic view illustrating an example of the relation between: the sight line angle (θx1) indicated by the sight line information (θ1°) at the first time point and the positions of the user's eyes at the first time point; and the sight line angle (θx3) indicated by the sight line information (θ3°) at the second time point and the positions of the user's eyes at the second time point.

As described above, the display controller 14 selects display data corresponding to the sight line information (θ3°) at the second time point, whereby display data different from display data that would be displayed as long as the selection is based on the sight line information (θ1°) at the first time point, is selected in some cases. FIG. 19 illustrates an example in which the first parallax image GR3 instead of the first parallax image GR1, and the second parallax image GL3 instead of the second parallax image GL1 are selected.

As illustrated in FIGS. 19 and 20, the X-directional angle θx3 indicated by the sight line information (θ3°) at the second time point is shifted in the X direction from the X-directional angle θx1 indicated by the sight line information (θ1°) at the first time point. Accordingly, the sight line angle {θ3+(W/2)}° of a right eye ER3 that is the position of the user's right eye ER corresponding to the angle θx3 is shifted from the sight line angle {θ1+(W/2)}° of the right eye ER1. Furthermore, the sight line angle {θ3−(W/2)}° of a left eye EL3 that is the position of the user's left eye EL corresponding to the angle θx3 is shifted from the sight line angle of the left eye EL1 {θ1−(W/2)}°. The display controller 14, which selects display data based on the sight line information (θ3°) at the second time point, selects image data on which such a difference in the sight line angle in the X direction is reflected, as display data. Accordingly, the display controller 14 selects the first parallax image GR3 and the second parallax image GL3 as display data corresponding to the sight line information (θ3°) at the second time point.

The above description with reference to FIGS. 17 to 20 is made on the shift in the X-directional sight line angle between the sight line information at the first time point and the sight line information at the second time point. The following describes the shift in the Y-directional sight line angle between the sight line information at the first time point and the sight line information at the second time point with reference to FIGS. 21 to 23. For simplification of description, it is assumed that only change of the Y-directional sight line angle occurs between the sight line information (θ3°) at the timing T3 and the sight line information (θ4°) at the timing T4.

Figure 21:
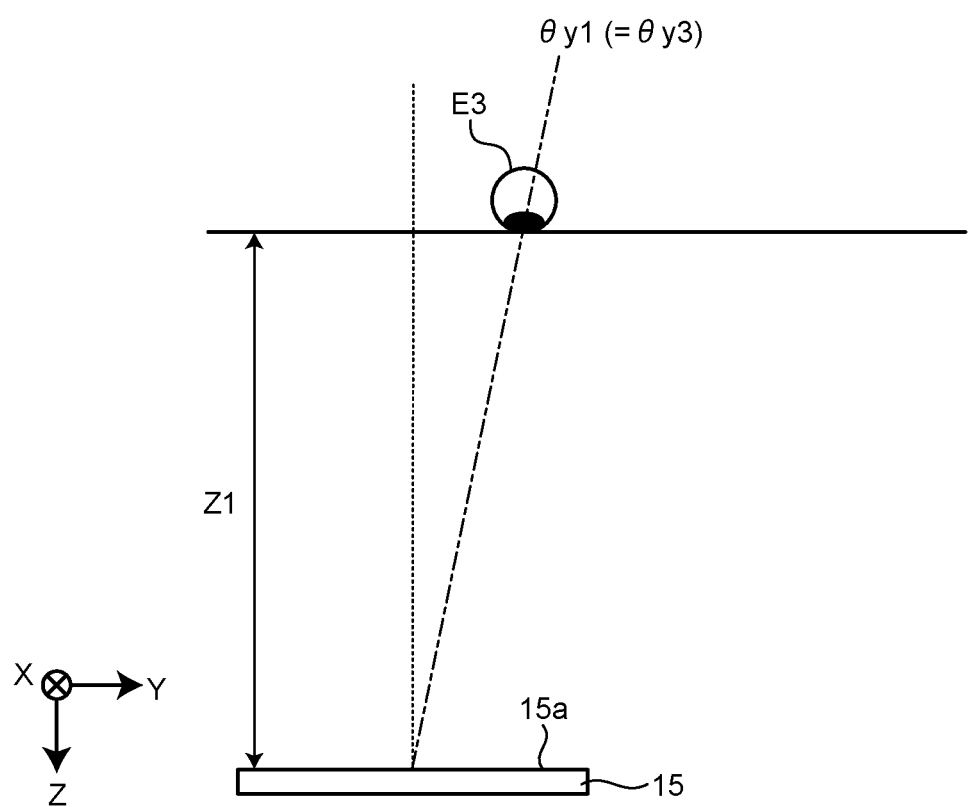
FIG. 21 is a schematic view illustrating a Y-directional angle indicated by sight line information of the user.

FIG. 21 is a schematic view illustrating the Y-directional angle indicated by the sight line information of the user. The angle θy1 illustrated in FIG. 21 is the Y-directional angle indicated by the sight line information (θ1°) at the first time point. The Y-directional angle indicated by the sight line information does not change between the sight line information (θ1°) and the sight line information (θ3°). Thus, in FIGS. 20 to 23, the Y-directional angle is indicated as the angle θy1 (=θy3).

Figure 23:
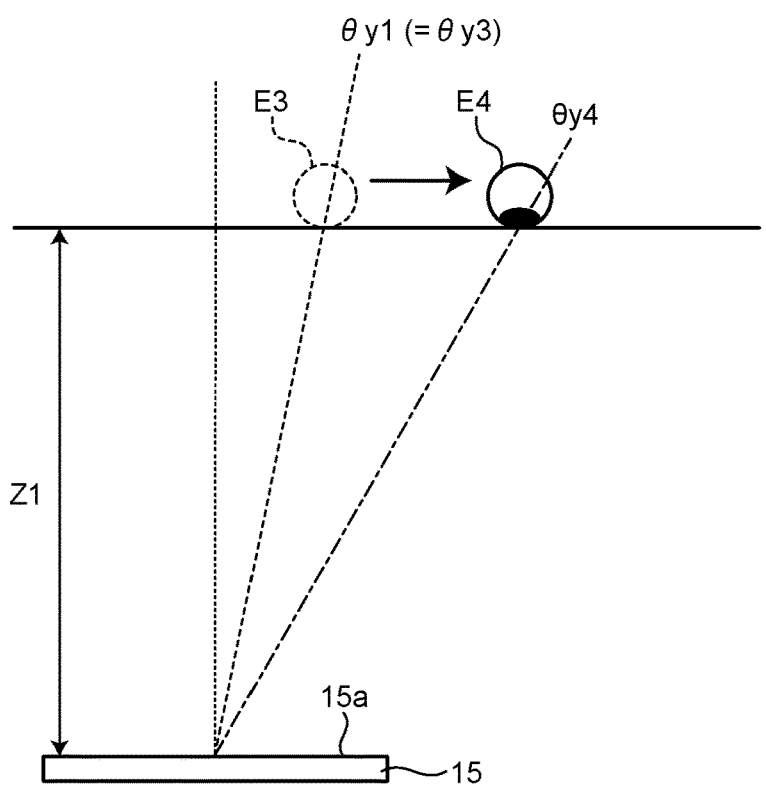
FIG. 23 is a schematic view illustrating an example of the relation between: a sight line angle (θy1) indicated by the sight line information (θ1°) at the first time point and the positions of the user's eyes at the first time point; and a sight line angle (θy4) indicated by the sight line information (θ4°) at the second time point and the positions of the user's eyes at the second time point.

In the embodiment, the right eye ER and the left eye EL of the user are arranged in the X direction but not in the Y direction. In the embodiment, it is regarded that the positions of the right eye ER and the left eye EL are the same in the Y direction. In FIG. 21 and FIG. 23 to be described later, the positions of the right eye ER and the left eye EL corresponding to the angle θy1 (=θy3) are indicated as an eye E3.

Figure 22:
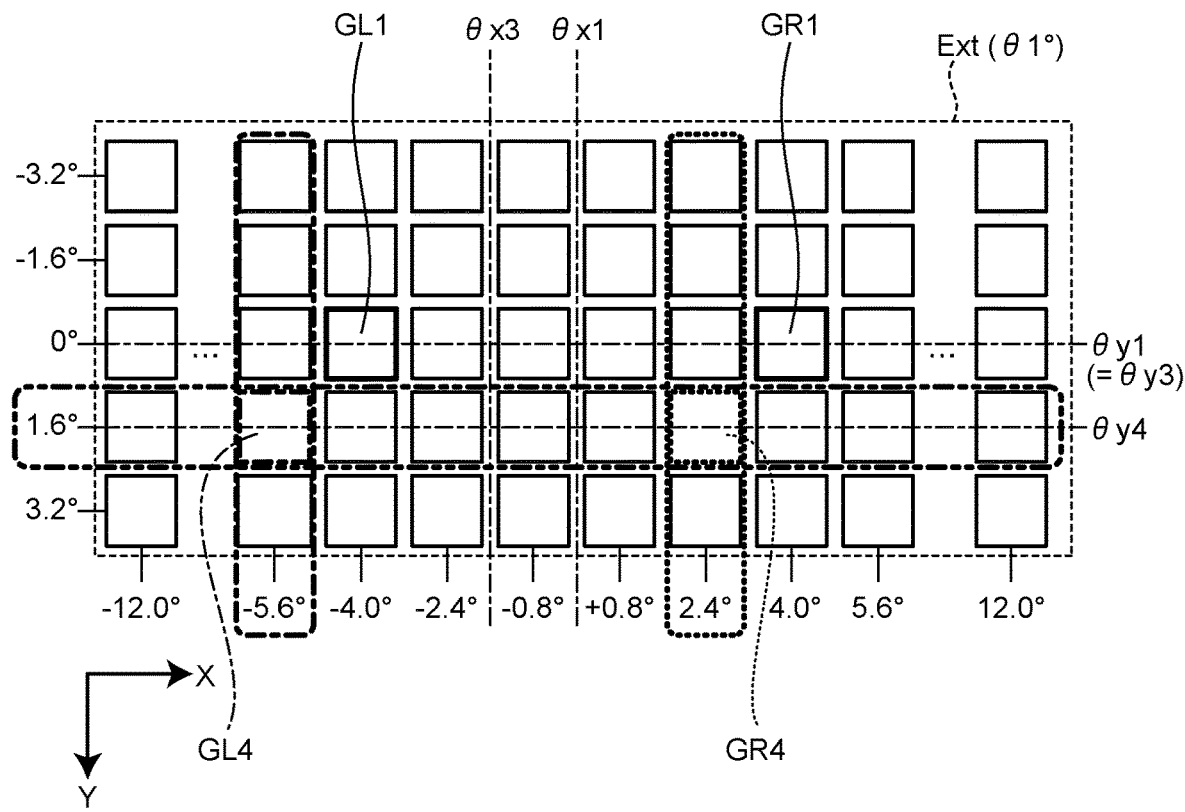
FIG. 22 is a schematic view illustrating an example of the relation between image data included in the image group data Ext(θ1°), the first parallax image GR1 and the second parallax image GL1 selected as display data based on the sight line information (θ1°) at the first time point, and a first parallax image GR4 and a second parallax image GL4 selected as display data based on sight line information (θ4°) at the second time point.

FIG. 22 is a schematic view illustrating an example of the relation between the parallax images (in other words, original images) included in the parallax image group Ext(θ1°), the first parallax image GR1 and the second parallax image GL1 selected as display data based on the sight line information (θ1°) at the first time point, and the first parallax image GR4 and the second parallax image GL4 selected as display data based on the sight line information (θ4°) at the second time point. FIG. 23 is a schematic view illustrating an example of the relation between: the sight line angle (θy1) indicated by the sight line information (θ1°) at the first time point and the positions of the user's eyes at the first time point; and the sight line angle (θy4) indicated by the sight line information (θ4°) at the second time point and the positions of the user's eyes at the second time point.

As described above, the display controller 14 selects display data corresponding to the sight line information (θ4°) at the second time point, and accordingly, display data different from display data that would be displayed as long as the selection is based on the sight line information (θ1°) at the first time point is selected in some cases. FIG. 23 illustrates an example in which the first parallax image GR4 instead of the first parallax image GR1, and the second parallax image GL4 instead of the second parallax image GL1 are selected.

As illustrated in FIGS. 22 and 23, the Y-directional angle θy4 indicated by the sight line information (θ4°) at the second time point is shifted in the Y direction from the Y-directional angle θy1 indicated by the sight line information (θ1°) at the first time point. Accordingly, an eye E4 as the positions of the user's right and left eyes ER and EL corresponding to the angle θy4 is shifted from the eye E3. The display controller 14, which selects display data based on the sight line information (θ4°) at the second time point, selects image data on which such a shift in the Y-directional sight line angle is reflected, as display data. Accordingly, the display controller 14 selects the first parallax image GR4 and the second parallax image GL4 as display data corresponding to the sight line information (θ4°) at the second time point.

Although the above description is individually made on the case where the shift in the X-directional sight line angle occurs between the sight line information at the first time point and the sight line information at the second time point (refer to FIGS. 17 to 20) and the case where the shift in the Y-directional sight line angle occurs between the sight line information at the first time point and the sight line information at the second time point (refer to FIGS. 21 to 23), both the shift in the X-directional sight line angle and the shift in the Y-directional sight line angle can naturally occur at the same time. In such a case, image data on which both shifts are reflected is selected.

The relation of the first parallax image GR3 and the second parallax image GL3 in the parallax image group Ext(θ3°) illustrated in FIG. 16 with the first parallax image GR5 and the second parallax image GL5 corresponds to the relation of the shift in the sight line angle between the sight line information at the first time point and the sight line information at the second time point, which is described above with reference to FIGS. 17 to 23. In a case where no shift in the sight line angle or such a small shift that selected image data does not change occurs between the sight line information at the first time point and the sight line information at the second time point, image data selected based on the sight line information at the first time point is identical to image data selected based on the sight line information at the second time point.

Image data completely matching the sight line angles {θxa±(W/2)} of the right eye ER and the left eye EL corresponding to the sight line information (θa°) at the second time point and the Y-directional sight line angle (θya) corresponding to the sight line information (θa°) is not necessarily included in the parallax image group Ext(θb°) corresponding to the sight line information (θb°) at the first time point. In such a case, the display controller 14 selects, from among image data included in the parallax image group Ext(θb°), image data obtained through image capturing at angles closest to {θxa±(W/2)} and (θya) thus derived.

Figure 24:
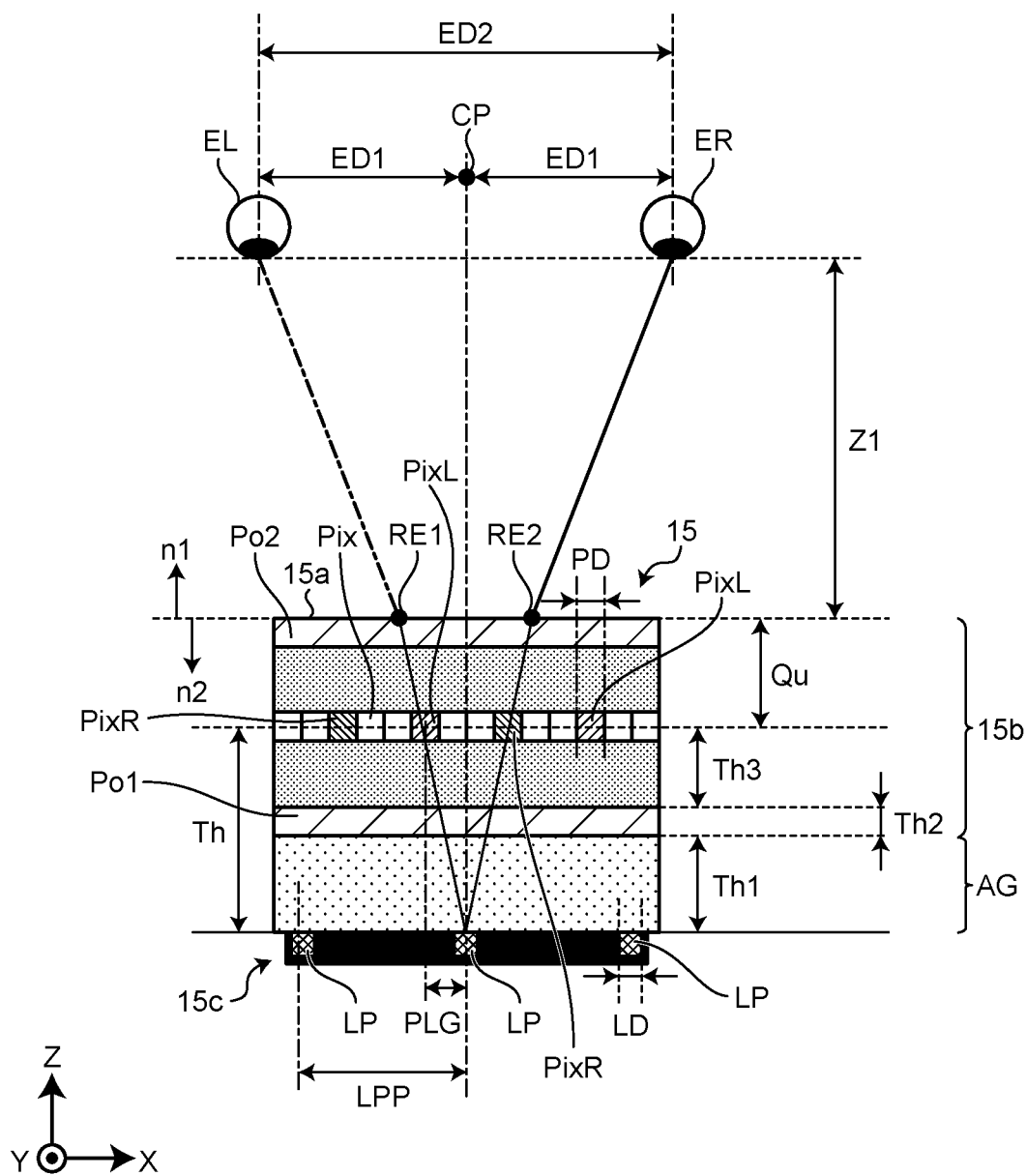
FIG. 24 is a schematic sectional view illustrating an exemplary specific form of a display that is employable in an embodiment.

The following describes an exemplary specific form of the display 15 capable of achieving 3D display using the parallax method with reference to FIG. 24.

FIG. 24 is a schematic sectional view illustrating an exemplary specific form of the display 15 employable in the embodiment. As illustrated in FIG. 24, the display 15 includes, for example, a liquid crystal panel 15b and a light source device 15c. The liquid crystal panel 15b is a transmissive liquid crystal display panel. The image display surface 15a according to the embodiment is one surface on the user side among panel plate surfaces of the liquid crystal panel 15b.

The liquid crystal panel 15b includes a plurality of pixels Pix mounted by, for example, what is called an active matrix method. The display 15 applies some of a plurality of pixels Pix arranged in the X direction to output of first image data (for example, the first parallax image GR3, GR4, or GR5) and applies the other some pixels Pix to output of second image data (for example, the second parallax image GL3, GL4, or GL5), thereby outputting display data obtained by integrating the first parallax image and the second parallax image. Display data D(θ3°), D(θ4°), and D(θ5°) illustrated in FIG. 16 and display data D(θ4A°), D(θ5A°), and D(θ6A°) illustrated in FIG. 25 to be described later are display data obtained by integrating the first parallax image and the second parallax image by such a concept.

The display controller 14 integrates the first image data and the second image data and causes the display 15 to output the integrated data, thereby outputting the display data. In FIG. 24, first pixels PixR outputting the first parallax image and second pixels PixL outputting the second parallax image are alternately arranged in a cycle of three pixels Pix arranged in the X direction, but such a relation between the first pixels PixR and the second pixels PixL is merely exemplary and the present disclosure is not limited thereto. The relation between the first pixels PixR and the second pixels PixL is determined as appropriate in accordance with various parameters such as a distance Z1 between each of the right eye ER and the left eye EL of the user and the image display surface 15a, a gap ED2 between the right eye ER and the left eye EL, a depth Th between a middle point of each pixel Pix in the Z direction and a light source point LP of light transmitted through a pixel Pix, and a width PD of each pixel Pix.

The light source device 15c is provided opposite the user with the liquid crystal panel 15b interposed therebetween. The light source device 15c emits light from the plurality of light source points LP toward the liquid crystal panel 15b. In other words, no light toward the liquid crystal panel 15b is generated in areas between the plurality of light source points LP of the light source device 15c. The plurality of light source points LP may be a plurality of point light sources such as micro light emitting diodes (LEDs) that are individually provided or may be formed by providing, between a surface light source and the liquid crystal panel 15b, a light-shielding layer provided with a plurality of holes corresponding to the positions of the plurality of light source points LP. In the configuration illustrated in FIG. 24, the plurality of light source points LP disposed at predetermined intervals (pitch LPP) in the X direction function in the same manner as the parallax formation part Par described above with reference to FIG. 5.

The pitch LPP illustrated in FIG. 24 corresponds to six pixels Pix arranged in the X direction, but this is merely exemplary and the present disclosure is not limited thereto. Each of the pitch LPP and a pitch LD of each light source point LP is one of the above-described various parameters and determined as appropriate in designing for achieving stereoscopic viewing by the user.

In FIG. 24, a gap AG is interposed between the liquid crystal panel 15b and the light source device 15c. For example, a light-transmitting member (for example, glass) having a refractive index n2 substantially equal to that of the liquid crystal panel 15b is provided in the gap AG, but the gap AG may be a space. However, when the gap AG is a space, a phenomenon similar to refraction to be described later is desirably considered between the gap AG and the liquid crystal panel 15b.

It is assumed that air is interposed between the image display surface 15a and each of the right eye ER and the left eye EL. Refraction occurs in accordance with the difference between a refractive index n1 of air and the refractive index n2 of a light-transmitting substrate (for example, a glass substrate) constituting the liquid crystal panel 15b. FIG. 24 illustrates an occurrence point RE1 and an occurrence point RE2. The occurrence point RE1 is an occurrence point of refraction that occurs between the propagation line of light emitted from a light source point LP toward the image display surface 15a through a second pixel PixL and the propagation line of light from the image display surface 15a toward the left eye EL. The occurrence point RE2 is an occurrence point of refraction that occurs between the propagation line of light emitted from the light source point LP toward the image display surface 15a through a first pixels PixR and the propagation line of light from the image display surface 15a toward the right eye ER. The refractive indexes n1 and n2 are included in the above-described various parameters.

The above-described various parameters may also include a variety of matters corresponding to a more detailed specific form of the display 15, such as provision of polarization plates Po1 and Po2 facing in the Z direction with the liquid crystal panel 15b interposed therebetween.

The above-described reference line is a straight line connecting the middle point CP between the right eye ER and the left eye EL to the focal point of the right eye ER and the left eye EL on the image display surface 15a. The distance between the middle point CP and the right eye ER in the X direction and the distance between the middle point CP and the left eye EL in the X direction are each equal to a gap ED1. The gap ED1 is ½ of the gap ED2.

In a case of the refractive index n1=1.0, for example, the refractive index n2 is 1.5. In a case of the gap ED2=62.5 mm, the gap ED1=31.25 mm, the distance Z1=380 mm, the width PD=0.0315 mm, and the pitch LPP=0.189 mm, parallax 3D display can be achieved by setting the depth Th=0.86 mm. The depth Th illustrated in FIG. 24 includes a thickness Th1 of the gap AG in the Z direction, a thickness Th2 of the polarization plate Po1 between the liquid crystal panel 15b and the light source device 15c in the Z direction, and a thickness Th3 in the Z direction corresponding to the thickness of a glass substrate provided on the light source device 15c side of the pixels Pix. In the display system 1, the depth Th can be more easily and highly accurately set by adjusting the thickness Th1 as appropriate in accordance with the thicknesses Th2 and Th3 determined in accordance with the design. For example, in a case of the thickness Th2=0.1 mm and the thickness Th3=0.2 mm, the thickness Th1 of the gap AG can be set to 0.56 mm. The distance between a middle position of the light source points LP in the X direction and one of a first pixel PixR and a second pixel PixL facing each other in the X direction with the middle position therebetween is, for example, 0.04725 mm. These specific numerical values are merely exemplary and the present disclosure is not limited thereto, but the numerical values are changeable as appropriate in accordance with the distance Z1, a specific form of the display 15, or the like.

The acquirer 11 in the embodiment includes the image capturing device 11a but may also include, for example, a distance measurer configured to acquire information indicating the distance between the user and the image display surface 15a in the Z direction. In this case, the distance Z1 may be a value measured by the distance measurer, and the display controller 14 may adjust the interval between the first pixel PixR and the second pixel PixL in accordance with the value. When such adjustment is performed, data indicating the correspondence relation between the value of the distance in the Z direction and the interval is stored in the storage 13 or the like in advance and can be referred by the display controller 14.

Modification

The following describes, with reference to FIG. 25, a modification in which part of the processing by the display controller 14 is different from that in the embodiment. The description of the modification is specially made on difference from the embodiment, whereas any same matter as in the embodiment is denoted by the same reference sign and description thereof is omitted.

FIG. 25 is a time chart schematically illustrating the process of information processing performed in the display system 1 according to the modification. The display controller 14 according to the modification derives the sight line information at the second time point based on the difference between sight line angles indicated by a plurality of pieces of the sight line information acquired at a plurality of time points later than the first time point referred in generation of the extracted element image group 22b as a source of the parallax image group Ext.

Specifically, the display controller 14 derives, for example, the sight line information (θ4A°) at the second time point (timing T4) based on the difference between sight line angles indicated by the sight line information (θ2°) acquired by the acquirer 11 at the timing T2 and the sight line information (θ3°) acquired at the timing T3. More specifically, the display controller 14 calculates, for example, a vector (direction and degree) of change from the sight line angle indicated by the sight line information (θ2°) acquired at the timing T2 to the sight line angle indicated by the sight line information (θ3°) acquired at the timing T3. The display controller 14 derives the sight line information (θ4A°) at the second time point (timing T4) by assuming that the vector continues from the timing T3 to the timing T4. In this manner, the display controller 14 calculates the vector based on the difference between sight line angles indicated by a plurality of pieces of the sight line information acquired at the first period and derives, through estimation, the sight line information following the latest sight line information already acquired, thereby employing the derived sight line information as the second sight line information.

The display controller 14 according to the modification selects display data corresponding to the sight line information at the second time point, which is derived as described above. In FIG. 25, a first parallax image GR4A and a second parallax image GL4A are selected from the parallax image group Ext(θ1°) in accordance with the sight line information (θ4A°) at the second time point (timing T4). Thus, the display 15 according to the modification can output the display data D(θ4A°) corresponding to the sight line information (θ4A°) derived through estimation as viewpoint information at the timing T4.

Similarly, the display controller 14 according to the modification derives the sight line information (θ5A°) at the second time point (timing T5) based on the difference between sight line angles indicated by the sight line information (θ3°) acquired by the acquirer 11 at the timing T3 and the sight line information (θ4°) acquired at the timing T4. In addition, the display controller 14 according to the modification derives the sight line information (θ6A°) at the second time point (timing T6) based on the difference between sight line angles indicated by the sight line information (θ4°) acquired by the acquirer 11 at the timing T4 and the sight line information (θ5°) acquired at the timing T5. The display controller 14 selects display data corresponding to the sight line information at the second time point, which is derived as described above, from the latest parallax image group Ext. In FIG. 25, a first parallax image GR5A and a second parallax image GL5A are selected from the parallax image group Ext(θ1°) in accordance with the sight line information (θ5A°) at the second time point (timing T5). In addition, a first parallax image GR6A and a second parallax image GL6A are selected from the parallax image group Ext(θ3°) in accordance with the sight line information (θ6A°) at the second time point (timing T6).

Derivation of the sight line information at the second time point based on the difference between sight line angles indicated by a plurality of pieces of the sight line information acquired at a plurality of time points later than the first time point referred in generation of the extracted element image group 22*b* as a source of the parallax image group Ext is not limited to the above-described method. For example, the derivation may be performed based on a vector derived from a longer term of perspective based on sight line angles indicated by three or more pieces of the sight line information or may performed by employing a known sight line movement estimation algorithm that estimates future sight line information based on a plurality of pieces of the sight line information detected in the past. Except for the matters specially described above, the modification is the same as the embodiment.

As described above, the terminal device 10 according to the embodiment includes: a display (display 15) that includes a plurality of pixels (pixels Pix) arranged in a predetermined direction (for example, the X direction) and is configured to output an image; an acquirer (acquirer 11) configured to periodically acquire information related to the sight line of a user visually recognizing the image; a storage (storage 13) configured to store image group data (extracted element image group 22*b*) provided from an external information processing device (server 20) based on the information at a first time point; and a display controller (display controller 14) configured to select display data corresponding to the sight line from among the image group data based on the information at a second time point later than at the first time point and cause the display to display the display data.

A display system (display system 1) according to the embodiment includes a display device (terminal device 10); and a server (server 20) provided to perform communication with the display device, the display device includes: a display (display 15) including a plurality of pixels (pixel Pix) arranged in a predetermined direction (for example, the X direction), the display being configured to output an image; an acquirer (acquirer 11) configured to periodically acquire information related to the sight line of a user visually recognizing the image; a storage (the storage 13) configured to store image group data (extracted element image group 22*b*) provided from an external information processing device (server 20) based on the information at a first time point; and a display controller (display controller 14) configured to select display data corresponding to the sight line from among the image group data based on the information at a second time point later than at the first time point and cause the display to display the display data, and the server includes: a storage (storage 22) configured to store original data (element image group 22*a*) including the image group data and including pieces of image data corresponding to three or more sight line angles, respectively; and an extractor (the extractor 25) configured to extract element image data as a source of the image group data from the original data based on the information.

According to the embodiment, parallax images corresponding to the viewpoint of the user at the second time point later than the first time point can be selected for display from among image group data provided based on the first time point. Thus, images corresponding to the viewpoint of the user at a later time point can be output.

The display data displayed by the display (display 15) is image data with which stereoscopic viewing is achieved through visual recognition of individual images by the right eye (right eye ER) and the left eye (left eye EL), respectively, of the user, and the display includes a parallax formation part configured to output the individual images to the right and left eyes, respectively, of the user. With this configuration, the display device configured to output a 3D image can output images corresponding to the viewpoint of the user at the second time point later than the first time point from among image group data provided based on the first time point. Thus, a 3D image corresponding to the viewpoint of the user at a later time point can be output. In the configuration illustrated in FIG. 24, the parallax formation part is achieved in a form of the light source device 15*c*.

The information related to the sight line of the user includes information indicating a reference angle (for example, θ1°) of the sight line of the user relative to an image display surface (image display surface 15a) of the display (display 15), the image group data (parallax image group Ext) includes image data (parallax image GC) corresponding to the reference angle at the first time point and image data corresponding to angles obtained by adding or subtracting mutually different error angles to or from the reference angle at the first time point, and the display controller (display controller 14) individually selects first image data (for example, the first parallax image GR3) corresponding to the right eye (right eye ER) of the user and second image data (for example, the first parallax image GR3) corresponding to the left eye (right eye ER) of the user from among a plurality of pieces of image data included in the image group data and causes the display to display the display data (for example, the display data D(θ3°)). With this configuration, a display device configured to output a 3D image can perform output based on images corresponding to the right and left eyes of the user at the second time point later than the first time point from among image group data provided based on the first time point.

The display device (terminal device 10) further includes a communication part (communication part 12) configured to perform communication with the external information processing device (server 20), the acquirer (acquirer 11) acquires the information related to the sight line of the user at a first period, the information is transmitted to the external information processing device at a second period longer than the first period, and the image group data (parallax image group Ext) is provided from the external information processing device at the second period. With this configuration, images corresponding to the viewpoint of the user at a later time point and acquired at the first period can be output while the frequency of communication between the display device and the external information processing device is kept at the second period.

The display controller (display controller 14) derives the information related to the sight line of the user at the second time point (for example, the timing T4) based on the difference between sight line angles indicated by a plurality of respective pieces of the information acquired at a plurality of time points (for example, the timings T2 and T3) later than the first time point (for example, the timing T1). Thus, images corresponding to a sight line estimated as the sight line of the user at a later time point can be output.

Specific forms of the element image group 22a and the element image data are not limited to the forms described above with reference to FIG. 13. At least one of the element image group 22a and the element image data may be, for example, a set of image data in which a plurality of pieces of image data captured by a plurality of respective image capturing devices described above with reference to FIGS. 6 and 7 are held intact. For example, when the element image group 22a is a set of image data in which a plurality of pieces of image data captured by a plurality of respective image capturing devices are held intact, and the element image data is the same as described above in the embodiment, the calculator 21 extracts the element image data from the parallax image data by performing processing of generating element image data from the element image group 22a in the processing at step S24.

The method of forming a component that functions as the parallax formation part Par is not limited to the above-described form of the display 15. For example, the parallax formation part Par may be a parallax barrier provided between the liquid crystal panel 15b and the user or between the liquid crystal panel 15b and the surface light source or may be a lenticular lens provided between the liquid crystal panel 15b and the user. When the parallax formation part Par is provided between the liquid crystal panel 15b and the user, the display 15 may be a light-emitting display device such as an organic light emitting diode (OLED) panel.

The acquirer may be provided outside the terminal device 10. For example, an additional display device configured to output, in a 2D or simpler 3D manner, the same object reproduced through 3D image output by the terminal device 10 may be provided separately from the terminal device 10. In this case, an additional acquirer 11 may be provided in the separate display device, and the terminal device 10 may output sight line information acquired by the acquirer 11 provided in the separate display device.

The present disclosure is not limited to 3D but is also applicable to output of any 3D image that can be reproduced by outputting images that generate a parallax between the right and left eyes through the parallax formation part.

It should be understood that the present disclosure provides any other effects achieved by aspects described above in the present embodiment, such as effects that are clear from the description of the present specification or effects that could be thought of by the skilled person in the art as appropriate.

What is claimed is:

1. A display device comprising:
    a display that includes a plurality of pixels arranged in a predetermined direction and is configured to output an image;
    an acquirer configured to periodically acquire information related to a sight line of a user visually recognizing the image;
    a storage configured to store image group data provided from an external information processing device based on the information at a first time point; and
    a display controller configured to select display data corresponding to the sight line from among the image group data based on the information at a second time point later than the first time point and cause the display to display the display data,
    wherein
    the display data is image data with which stereoscopic viewing is achieved through visual recognition of individual images by right and left eyes, respectively, of the user,
    the display includes a parallax formation part configured to output the individual images to the right and left eyes, respectively, of the user,
    the information includes information indicating a reference angle of the sight line of the user relative to an image display surface of the display,
    the image group data includes image data corresponding to the reference angle at the first time point and image data corresponding to angles obtained by adding or subtracting mutually different error angles to or from the reference angle at the first time point, and
    the display controller is configured to individually select first image data corresponding to the right eye and second image data corresponding to the left eye from among a plurality of pieces of image data included in the image group data and cause the display to display the display data obtained by integrating the first image data and the second image data.

2. The display device according to claim 1, further comprising a communication part configured to perform communication with the external information processing device, wherein
the acquirer is configured to acquire the information at a first period,
the information is transmitted to the external information processing device at a second period longer than the first period, and
the image group data is provided from the external information processing device at the second period.

3. The display device according to claim 2, wherein the display controller is configured to derive the information at the second time point based on a difference between sight line angles indicated by a plurality of respective pieces of the information acquired at a plurality of time points later than the first time point.

4. A display system comprising:
a display device; and
a server that is capable of performing communication with the display device,
wherein the display device includes
a display that includes a plurality of pixels arranged in a predetermined direction and is configured to output an image,
an acquirer configured to periodically acquire information related to a sight line of a user visually recognizing the image,
a storage configured to store image group data provided from the server based on the information at a first time point, and
a display controller configured to select display data corresponding to the sight line from among the image group data based on the information at a second time point later than the first time point and cause the display to display the display data,
wherein the server includes
a storage configured to store original data including the image group data and including pieces of image data corresponding to three or more sight line angles, and
an extractor configured to generate an extracted element image group as a source of the image group data from the original data based on the information, and
wherein
the display data is image data with which stereoscopic viewing is achieved through visual recognition of individual images by right and left eyes, respectively, of the user,
the display includes a parallax formation part configured to output the individual images to the right and left eyes, respectively, of the user,
the information includes information indicating a reference angle of the sight line of the user relative to an image display surface of the display,
the image group data includes image data corresponding to the reference angle at the first time point and image data corresponding to angles obtained by adding or subtracting mutually different error angles to or from the reference angle at the first time point, and
the display controller is configured to individually select first image data corresponding to the right eye and second image data corresponding to the left eye from among a plurality of pieces of image data included in the image group data and cause the display to display the display data obtained by integrating the first image data and the second image data.

5. The display system according to claim 4, wherein
the display device comprises a communication part configured to perform communication with the server,
the acquirer is configured to acquire the information at a first period,
the information is transmitted to the server at a second period longer than the first period, and
the image group data is provided from the server at the second period.

6. The display system according to claim 5, wherein the display controller is configured to derive the information at the second time point based on a difference between sight line angles indicated by a plurality of respective pieces of the information acquired at a plurality of time points later than the first time point.

* * * * *